United States Patent

Korelitz et al.

[15] 3,636,328

[45] Jan. 18, 1972

[54] AUTOMATIC DESIGNING

[72] Inventors: Theodore H. Korelitz, Newton; Alvin C. Brodie, Greenbush, both of Mass.

[73] Assignee: The Badger Company, Inc., Cambridge, Mass.

[22] Filed: Sept. 3, 1968

[21] Appl. No.: 767,891

Related U.S. Application Data

[63] Continuation-in-part of Ser. No. 419,466, Dec. 18, 1964, which is a continuation-in-part of Ser. No. 223,324, Sept. 13, 1962, abandoned.

[52] U.S. Cl. .......... 235/151.1, 340/172.5

[51] Int. Cl. .......... G06g 7/48

[58] Field of Search .......... 235/150.27, 197, 151, 151.11, 235/151.1; 346/25; 33/18; 340/172.5

[56] References Cited

UNITED STATES PATENTS 3,126,635 3/1964 Muldoon et al. .......... 235/151.11 X 3,145,474 8/1964 Taylor .......... 235/151 X

OTHER PUBLICATIONS

Ledgerwood, F. K. " Automatically Programmed Tool: Simplifies the Man–Machine Communication Problem" - Control Engineering April, 1959 pgs. 21–26

*Primary Examiner*—Eugene G. Botz
*Assistant Examiner*—Joseph F. Ruggiero
*Attorney*—Sol B. Wiczer

[57] ABSTRACT

An automated designing system which includes the steps of orienting mechanical units into a plot plan, converting the orienting plot plan data to algorithmic form acceptable to a computer, orienting the plot plan elements dimensionally within the memory of the computer, imposing design-significant limits upon the computer operation, operating the computer to produce within its memory linear-significant data interconnecting elements of said plan and then converting said data from the memory of said computer to visible form either directly or from intermediate storage form.

8 Claims, 14 Drawing Figures

INVENTORS
ALVIN C. BRODIE
THEODORE H. KORELITZ

BY Sol B. Wiczer
ATTORNEY

INVENTOR

ALVIN C. BRODIE
THEODORE H. KORELITZ

BY Sol B. Wiczer
ATTORNEY

INVENTORS
ALVIN C. BRODIE
THEODORE H. KORELITZ

BY Sol B. Wiczer
ATTORNEY

INVENTORS
ALVIN C. BRODIE
THEODORE H. KORELITZ

BY Sol B. Wiczer
ATTORNEY

INVENTORS
ALVIN C. BRODIE
THEODORE H. KORELITZ

BY Sol B. Wiczer
ATTORNEY

| EQUIPMENT REPRESENTATION ON INPUT CARDS | | | | | | |
|---|---|---|---|---|---|---|
| IDENT. CODE | CENTERPOINT | | | DIMENSIONS | | |
| | X | Y | Z | X | Y | Z |
| A01Z | 672 | 688 | 1456 | 172 | 172 | 2912 |
| M01Y | 1272 | 932 | 648 | 148 | 156 | 148 |
| T01Y | 384 | 640 | 144 | 48 | 832 | 48 |
| T02Y | 1006 | 744 | 554 | 66 | 1040 | 88 |
| T03Y | 1512 | 648 | 168 | 60 | 848 | 60 |
| P01Y | 544 | 1480 | 80 | 120 | 272 | 160 |
| P02Y | 808 | 1480 | 80 | 120 | 272 | 160 |
| P03Y | 1072 | 1480 | 80 | 120 | 272 | 160 |
| P04Y | 1320 | 1480 | 56 | 84 | 272 | 64 |
| P05Y | 1396 | 1480 | 56 | 84 | 272 | 64 |

Fig-6

| EQUIPMENT ALGORITHMS AFTER CONVERSION AS STORED IN COMPUTER MEMORY | | | | | | |
|---|---|---|---|---|---|---|
| IDENT. | $X_{MIN.}$ | $Y_{MIN}$ | $Z_{MIN.}$ | $X_{MAX.}$ | $Y_{MAX.}$ | $Z_{MAX.}$ |
| 41013 | 05860 | 06020 | 00000 | 07580 | 07740 | 29120 |
| 54012 | 11980 | 07040 | 05740 | 13460 | 11600 | 07220 |
| 63012 | 03600 | 02240 | 0120 | 04080 | 10560 | 01680 |
| 63022 | 09640 | 02240 | 05100 | 10520 | 12640 | 05980 |
| 63032 | 14820 | 02240 | 01380 | 15420 | 10720 | 01980 |
| 57012 | 04840 | 13440 | 00000 | 06040 | 16160 | 01600 |
| 57022 | 07480 | 13440 | 00000 | 08680 | 16160 | 01600 |
| 57032 | 10120 | 13440 | 00000 | 11320 | 16160 | 01600 |
| 57042 | 12780 | 13440 | 00240 | 13620 | 16160 | 00880 |
| 57052 | 13540 | 13440 | 00240 | 14380 | 16160 | 00880 |

Fig-7

INVENTORS
ALVIN C. BRODIE
THEODORE H. KORELITZ

BY Sol B. Wiczer
ATTORNEYS

INVENTORS
ALVIN C. BRODIE
THEODORE H. KORELITZ
BY Sol B. Wiczer
ATTORNEY

INVENTORS
ALVIN C. BRODIE
THEODORE H. KORELITZ

BY Sol B. Wiczer
ATTORNEY

INVENTORS
ALVIN C. BRODIE
THEODORE H. KORELITZ

BY Sol B. Wiczer
ATTORNEY

COORDINATES OF POINTS

| PATH NO. | PATH | POINT A | | | POINT: FIRST INTERMEDIATE | | | POINT: SECOND INTERMEDIATE | | | POINT B | | |
|---|---|---|---|---|---|---|---|---|---|---|---|---|---|
| | | X | Y | Z | X | Y | Z | X | Y | Z | X | Y | Z |
| 1 | $A - A_{10} - A_4 - A_5 - B$ | 117 | 240 | 42 | 290 | 240 | 42 | 290 | 352 | 42 | 290 | 352 | 550 |
| 2 | $A - A_{10} - A_1 - A_2 - B$ | 117 | 240 | 42 | 290 | 240 | 42 | 290 | 240 | 550 | 290 | 352 | 550 |
| 3 | $A - A_{11} - A_6 - A_5 - B$ | 117 | 240 | 42 | 117 | 352 | 42 | 290 | 352 | 42 | 290 | 352 | 550 |
| 4 | $A - A_{11} - A_7 - A_3 - B$ | 117 | 240 | 42 | 117 | 352 | 42 | 117 | 352 | 550 | 290 | 352 | 550 |
| 5 | $A - A_{12} - A_8 - A_2 - B$ | 117 | 240 | 42 | 117 | 240 | 550 | 290 | 240 | 550 | 290 | 352 | 550 |
| 6 | $A - A_{12} - A_9 - A_3 - B$ | 117 | 240 | 42 | 117 | 240 | 550 | 117 | 352 | 550 | 290 | 352 | 550 |

FIG. 13

EQUIPMENT TABLE

| EQUIPMENT CODE | $X_{MIN}$ | $Y_{MIN}$ | $Z_{MIN}$ | $X_{MAX}$ | $Y_{MAX}$ | $Z_{MAX}$ |
|---|---|---|---|---|---|---|
| P - 81 - X | 130 | 228 | 27 | 165 | 252 | 57 |
| M 26 Z | 258 | 340 | 12 | 282 | 364 | 600 |

FIG. 12

INVENTOR
THEODORE H. KORELITZ
ALVIN C. BRODIE
BY
Sol B. Wiczer
ATTORNEY

| BLOCKS FORMED BY SEGMENTS OF PATHS<br>LINE DIAMETER = 10 INCHES | | | | | | | |
|---|---|---|---|---|---|---|---|
| PATH NO. | SEGMENT NO. | X MIN. | Y MIN. | Z MIN. | X MAX. | Y MAX. | Z MAX. |
| 1 | $A_{10}$ | 109 | 232 | 34 | 298 | 248 | 50 |
| 1 | $A_4$ | 282 | 232 | 34 | 298 | 360 | 50 |
| 1 | $A_5$ | 282 | 344 | 50 | 298 | 360 | 558 |
| 2 | $A_{10}$ | 109 | 232 | 34 | 298 | 248 | 50 |
| 2 | $A_1$ | 282 | 232 | 34 | 298 | 248 | 558 |
| 2 | $A_2$ | 282 | 232 | 542 | 298 | 360 | 558 |
| 3 | $A_{11}$ | 109 | 232 | 34 | 125 | 360 | 50 |
| 3 | $A_6$ | 109 | 344 | 50 | 298 | 360 | 50 |
| 3 | $A_5$ | 282 | 344 | 50 | 298 | 360 | 558 |
| 4 | $A_{11}$ | 109 | 232 | 34 | 125 | 360 | 50 |
| 4 | $A_7$ | 109 | 344 | 34 | 125 | 360 | 558 |
| 4 | $A_3$ | 109 | 344 | 542 | 298 | 360 | 558 |
| 5 | $A_{12}$ | 109 | 232 | 34 | 125 | 248 | 558 |
| 5 | $A_8$ | 109 | 232 | 542 | 298 | 248 | 558 |
| 5 | $A_2$ | 282 | 232 | 542 | 298 | 360 | 558 |
| 6 | $A_{12}$ | 109 | 232 | 34 | 125 | 248 | 558 |
| 6 | $A_9$ | 109 | 232 | 542 | 125 | 360 | 558 |
| 6 | $A_3$ | 109 | 344 | 542 | 298 | 360 | 558 |

FIG. 14

INVENTOR
THEODORE H. KORELITZ
ALVIN C. BRODIE
BY
Sol B. Wiczer
ATTORNEY

AUTOMATIC DESIGNING

This application is a continuation-in-part of our copending application filed Dec. 18, 1964, bearing Ser. No. 419,466, entitled Automated Designing, in turn a continuation-in-part of our copending application filed Sept. 13, 1962, bearing Ser. No. 223,324, entitled Automated Designing, now abandoned.

This invention relates to linear design, including compilation of orienting data for originating and destination points and the structural elements associated therewith, forming part of a plot plan to be interconnected, programming a computer with such orienting data and with limits useful to produce linear-significant interconnecting data, and converting such data to visibly useful form.

In broad method aspect for developing visibly linear-significant design data, this invention includes the steps of orienting mechanical units into a plot plan, two or three dimensionally, converting the orienting plot plan data to algorithmic form acceptable to a computer, orienting the plot plan elements dimensionally within the memory of the computer, imposing design-significant limits upon the computer operation, operating a computer to produce within its memory linear-significant data interconnecting elements of said plan and then converting said data from the memory of said computer to visible form either directly or from intermediate storage form.

The invention further includes the operation of the computer upon such data in combination with an auxiliary data storage system whereby the computer develops greater capacity for producing and storing the linear-significant data in greater size, even beyond the capacity of an average computer to store that many numbers within its memory.

The invention further includes the combination with the orienting data and programmed limits upon the linear-significant interconnecting data produced from said data within said limits in the memory of the computer, with or without additional storage data means, of means to convert said data to drawings or other visible form in any desired view. Other important steps for the method and combination of apparatus units to operate this method will be inherent in the ensuing description.

Particularly, following the method steps of this invention or using the combined means, the computer mathematically determines and produces data significant of limited linear passageways interconnecting several or numerous three-dimensionally arranged points which have been further mathematically programmed into the computer, whereby said linear passageway data can be availably stored or reduced to drawings such as by as X–Y plotter or other commercially available drafting machine which forms lines drawn between the said points and according to the computer programmed limits, in any desired view. Thus, according to this invention, visible lines such as drawings may be formed, or data significant of said visible lines or drawings can be formed as rapidly as isolated data points and connective limits can be coded and fed into the memory of a computer, by calculations, i.e., computing of linear passageway data significant of lines, computed by the computer at its usual high speed and then converted to visible line form by, for example, operation of a drafting machine such as an X–Y plotter thereon.

It is known in the art to directly copy dimensionally oriented points from a drawing in sufficient numbers to approximate lines, such data being then placed upon punch cards or tape in a form readable into the memory of a computer, and then passed or stored in the memory of a computer from which may be directly obtained and reproduced the original drawing from which it was copied. For instance, a drafting machine, Universal Drafting Machine Company, "Orthomat" or an X–Y plotter, are known units capable of being operated by punch card or tapes upon which such data can be emplaced, the drawing being reproduced by a continuously operating stylus forming the lines of a drawing. Such system is a mere copying and reproducing system, but not an original design system. The present system develops designs in contrast to merely copying already developed designs.

Thus, the present invention is a marked improvement over those prior practices in that the separate elements to be interconnected, integrated or developed into a composite design are first three-dimensionally oriented into a plot plan, a rough element orientation or arrangement plan from which such elements are then integrated by the computer into the final design. The significant dimensional points oriented first on the plot plan are converted algorithmically to a form acceptable to a computer, stored within the memory of the computer only as isolated data points, each oriented in space, two or three dimensionally with respect to a common origin point. Certain programmed limits are imposed upon the possibly available lines and the computer is then actuated to mathematically "-draw," compute a linear-significant series of data points to interconnect the several isolated originally programmed points within the imposed limits. The linear-significant data point series follows a path between the originally programmed points, according to whatever limiting rules have been further supplied to the computer, thus constraining the linear data-point paths between the original points to any further desired limits.

Such limiting path or passageway rules may be, for example, that the paths interconnecting the original points to be developed by the computer should be the shortest practical path between the points that can be taken within certain other limits. Another rule may be that such path shall comprise a space limit for the rest, so that no path may spacially interfere with, be too close to, or be intersected one by another; nor be so directed as to pass too close to or be interrupted by or suffer practical operational interference by the presence of some other path or apparatus unit. Another limit may be that the paths themselves are constrained to pass between the original points to be connected while each lies parallel to one or more of the X-, Y- and Z-axes, an effect that allows an arbitrarily imposed order and symmetry among the paths. Another limit may be that all of the paths are arbitrarily restricted never to descend below, pass above or beyond a certain height or boundary, i.e., to keep the lines compacted or expanded, or an arbitrarily fixed area clear of any lines passing therethrough. Thus, the lines may also be further so limited that no path may be separated farther, or approach closer, than a fixed distance, i.e., number of inches or feet to another, to provide compactness or working space for installation of pipe and repairs thereof, or to avoid having any interchanging effect; for instance, radiation, heat transfer, magnetic, inductance or electrically conductive or interferring effect one path or pipe upon the next. There may be imposed a minimum length of passage in any one direction, or in the case of piping, a minimum length of single directional passage from a fitting, elbow bend, flange, tee, coupling, valve or nozzle, etc. It may be that a further desired limit is that a path shall have a minimum number of bends in passage to interconnect the original points. Conversely, it could be required that most of the paths or a large portion of each, must pass close to each other for convenience of assembly, bracing, support or servicing of pipes, etc. Other oftime arbitrary or even capricious limits can be imposed, as desired, even taking advantage of rules of logic, mechanical engineering or electrical building codes, specification limits, etc. The great mathematical precision, flexibility and orderliness available from a computer can be used to limit, for instance, the order of development of the paths to an arbitrary sequence, starting first with the longest or shortest, or the longest in an arbitrary X-, Y- or Z-direction, etc.

The completely connected design data developed in the computer and either retained there or upon memory storage discs, are then converted to visible form, preferably drawings, or a stored form, i.e., punch cards or tape, which can be converted to drawings. It will be understood that the present invention produces a visible design starting from a plot plan from which a computer is programmed with few or many points to be interconnected, all developed from the original plot plan of initial measurements and spatial arrangement of units comprising the ultimate design into which they are to be integrated often in combination with previously stored dimensional elements already in the memory of the computer or available from other, such as a disc storage means; for example, an IBM 1311 Disc Storage Drive, Model No. 3, magnetic tape, punch cards as typical sources of stored data. Such sources supply algorithmically few or many oriented points to be interconnected. Most usually each path to be computed has only an origin and destination point. The limits to be placed upon the paths by which such points are to be interconnected is also programmed into the memory of the machine. The computer is then caused to compute a linear series of data points significant of the passageway to interconnect the several points thus programmed. The computer produces such linear data in a useful form, retaining it in its memory or producing it in visible typewritten or other tabulated data form. It may also produce such data output magnetically emplaced, or punched, on tape, or produced in punchcard form, or restored back into disc storage drive from which it can ultimately be reproduced again in any of said forms; or it may even be returned to the memory of the computer, the computer data being thus useful for storage and subsequent use or immediate conversion to the visible form such as conversion to the visible lines of a drawing by supplying the data to a commercial drafting machine, as mentioned above, typically an X–Y plotter.

Such drafting machine may be directly combined with the computer for directly operating upon the computed data, converting the point series passageway data in the memory of the computer into drawings graphically illustrating the originally oriented points to be interconnected and the computed interconnecting lines. The computer can also be caused to draw regular geometric shapes for emplacement and drafting in oriented position in conjunction with the points to be interconnected hereby. For instance, the computer can draw circles, cylinders, rectangles and the like oriented according to given dimensions as well as with respect to center points, connecting nozzles and the like. Since the computer can very readily have any part of linear data, for example the data points, taken for any direction suppressed, it is possible to constrain the computer to supply data significant only of the lines which can appear to be in a single plane, i.e., the X–Y plane; or only the lines which may appear in an X–Z plane; or only the lines which appear in a Y–Z plane and each at a selected dimension level (or any intermediate plane). It is possible within the usual flexibility of the computer to produce data three dimensionally as a combination of all three planes; so, for instance, the drawing can be an isometric view. Hence, the data thus produced by the computer and supplied for operation of the drafting machine such as the X–Y plotter can produce any given view; for instance, a plan view, i.e., a sheet of drawings illustrating the paths interconnecting originally programmed points, according to the further limits placed thereon as programmed into the machine in any view such as, for example, a plan view corresponding to lines lying in the X–Y plane; and/or a side view corresponding to lines lying in the Y–Z plane; and/or a front elevation corresponding to lines lying in the X–Z plane, or an isometric view, according to conventional engineering drafting practice. Indeed, with the greater computer flexibility by standard analytical geometry methods, the data can be made available for illustrating such system lying in any arbitrarily selected plane.

Among the immediate practical applications of this system is the production of a normal engineering piping drawing showing the location of an arrangement of ducts or pipes connecting, for example, numerous operating units of a system for fluid passage between operating units. For example, a typical chemical or fluid handling process may comprise a tower for distillation, (extraction, vapor contact and the like), which has an inlet for materials, usually at one end (or other suitable site upon the unit) and outlets (or inlets) for treated or treating materials at the other. Such system may further have pumps, heat exchangers, refrigeration units, compressors, cooling or wash water supply lines, steam- or air-power lines, chemical supply tanks, storage tanks and the like, all of which need to be interconnected into a unitary operating system for fluid passage between its various units with piping.

According to the present invention the preliminary step consists of forming a plot plan in which elements to be incorporated in the design are three-dimensionally oriented. The position of such elements with respect to an origin as in typical design drafting is laid out and the critical elements, the dimensions of the units and their position in the system is measured and converted to algorithmic form acceptable to a computer. Such initial data passed to the computer specifies the location, spacing and approximate dimensions of the several operating units to be integrally designed into the system in *x*-, *y*- and *z*-directions with respect to a common origin from which all may be measured. This initial data locates, spaces and dimensions any of the units with respect to the others.

As a next step, the three-dimensional location of the exact line or piping connection point or "nozzle" as it is commonly termed in the art, is oriented into the plot plan from which it may then be transferred into the memory of the computer for each of the units, further reading and identifying into the memory of the computer which units of the system are to be interconnected at these points.

Finally, limitations are placed in the memory of the computer indicative of the paths to be followed along lines mentioned above; for example, (a) that the longest or most extensive line or pipe is to be computed first; (b) that one pipe shall not intersect the next; (c) that one pipe shall not come closer or, for most of its length, not be separated more than a certain number of inches either from the last computed pipe or from any unit oriented into the system; (d) that the pipes shall pass from point to point parallel to X-, Y- or Z-axes; (e) in the minimum length of path; and (f) with the minimum number of bends, and the like; (g) that each pipe or line shall be disposed according to standard engineering rules of design; and (h) that local laws, or industry-wide standards of building conditions, rules, trade practices applicable to the particular type of plant will be observed.

The computer will then mathematically interconnect the so-called nozzles of the units to be interconnected, calculating the paths by analytical geometrical procedure within the three-dimensionally arranged framework, observing each of the limits as thus outlined in its memory. Thus, critical starting point data is placed into the memory of the computer, but the computer-plotter system, within its imposed limits of the character described, has a free hand in the actual piping or line layout, the specific pathways, or their equivalent in mathematical data linearly interconnecting the orientation points.

Of course, this computer drafting system, thus operated, can take advantage of all of the normal uses of a computer and do any of the extra normal tasks that a computer does usually. For instance, it can also be used to measure or sum up the lengths of the calculated pipe, or count the numbers of valves, fittings, tees, flanges, elbows, bends, reducers, unions, couplings, or add or calculate the weight or length of the pipe as a total, sum up the price of any particular kind of unit, elbow, valve, flange, etc., and maintain a total cost or weight balance or other simple arithmetical or summation of data useful with a piping layout and use of a computer therewith.

Of course, in an electrical system, lengths of wire, connectors, insulators, transformers and the like, typical of that kind of electrical system; or sprinkler for a fire extinguishing system; tanks and other standard processing units in a dairy system; terminal units in an air conveyor system; sewer inlets and outlets; turbines, relays, automatic switching systems, each comprising units typical of the kind of interconnected system being designed, are cost or number estimated.

The invention, moreover, has other uses than drafting or formation of linear-data points for conversion to a piping diagram (drawing). It is suitable for other illustrative purposes to mathematically lay out data points significant of any drawing, two or three dimensional, in any selected view, including lines and points on any plane at selected angles. For instance, we contemplate such application of this method and apparatus as for reproducing weather data in linear diagram form, producing civil engineering drawings such as highway cut and fill diagrams, graphically checking automatic machine tool programs, diagramming of water-oil barrier studies such as in secondary oil recovery systems, graphically diagramming printed or other fixed line electrical circuits and the like, piping of chemical plants and oil refineries, piping of power plants including atomic energy power plants, piping of waterworks and filtration plants including sea water desalting systems, piping of steam, oil, gas and water distribution systems, air-conditioning, heating, plumbing systems, marine power plants including ship piping and aircraft and missile systems, submarine piping, fire sprinkler systems, dairy processing, liquid rocket fuel ducting, air conveyor systems, telephone, telegraph and electrical lines, underground sewer, water supply, electrical and gas lines, the latter to approximate street locations as well as interconnecting points with various trunk lines, and the like. Particularly the system is capable of directing the ducting through certain areas, for instance, under definitely laid out streets while avoiding passage through buildings, basements, etc.

Thus, the system embraces the computing, linearly, of the paths in a series of points as interconnecting lines, conduits or pipes between graphically oriented points, the linear computation observing any superimposed rules that have been placed in the memory of the computing machine, and the reproducing of such linear data in a manner whereby it may be visibly illustrated such as by drawings in any of the many views by an X–Y plotter or the like.

For an improved understanding of this invention to describe its operation in practical detail, the accompanying drawings are presented but it will be understood that they are only for illustrative purposes to explain the practical operation and use of the invention for producing engineering piping drawings; or data significant thereof, including operation of an X–Y plotter which will visibly print the mathematically preformed data into drawings.

FIG. 5 is a diagram illustrating isometrically a plot plan outline of units to be interconnected and the measurement of distances for identification of units of the system of which FIGS. 2, 3 and 4 are ultimate drawings in which the system has been interconnected;

FIG. 6 is a table illustrating the manner of coding of equipment units upon cards in tabular form upon which are placed the center point and dimensional orientation of units of a system in X, Y and Z distance terms;

FIG. 7 is the algorithmic form of such data as determined by the machine;

FIG. 8 is a diagram illustrating the numerous line choices of a computer to select any of several passageways to interconnect specific points;

FIGS. 12, 13 and 14 list the data in tabular form as referred to in example 1.

Figure 2:
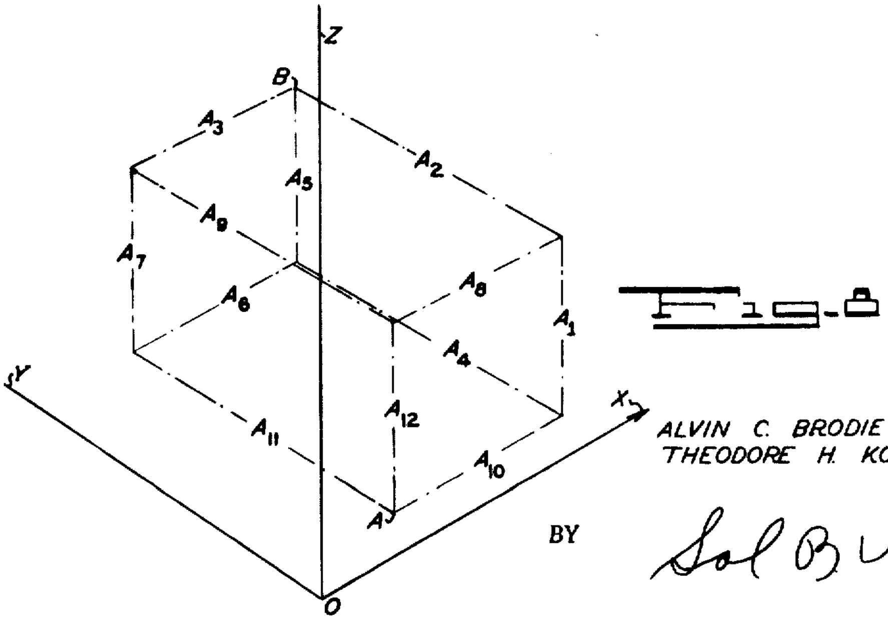
FIG. 2 is a design drawing in plan view illustrating an ultimate plotter output in the X–Y plane from line series data produced by a computer from the initial plot plan of FIG. 5 according to the invention.
Figure 2:
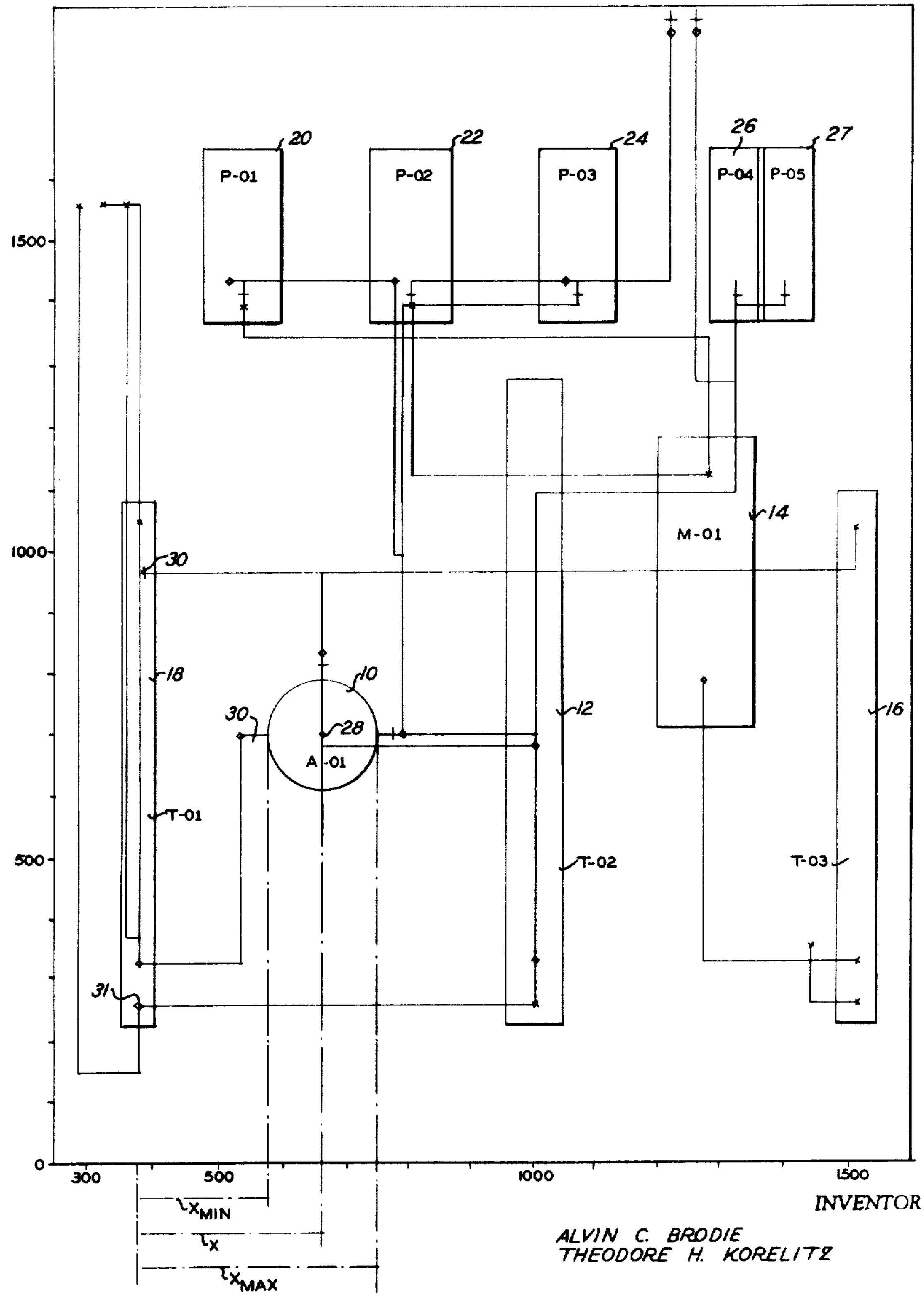
Figure 3:
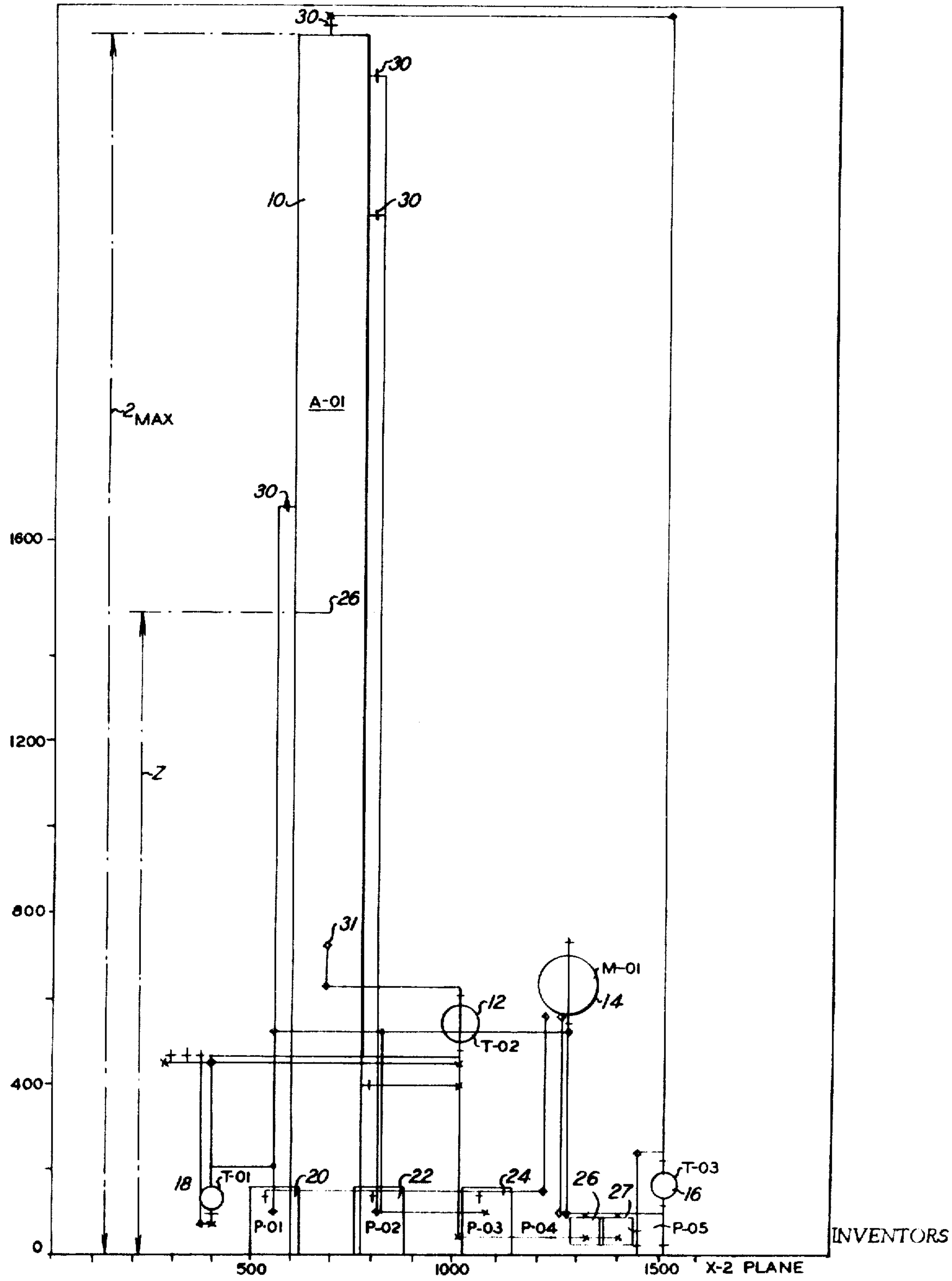
FIG. 3 is the front elevational view in the X–Z plane corresponding to the piping design of FIG. 2.
Figure 4:
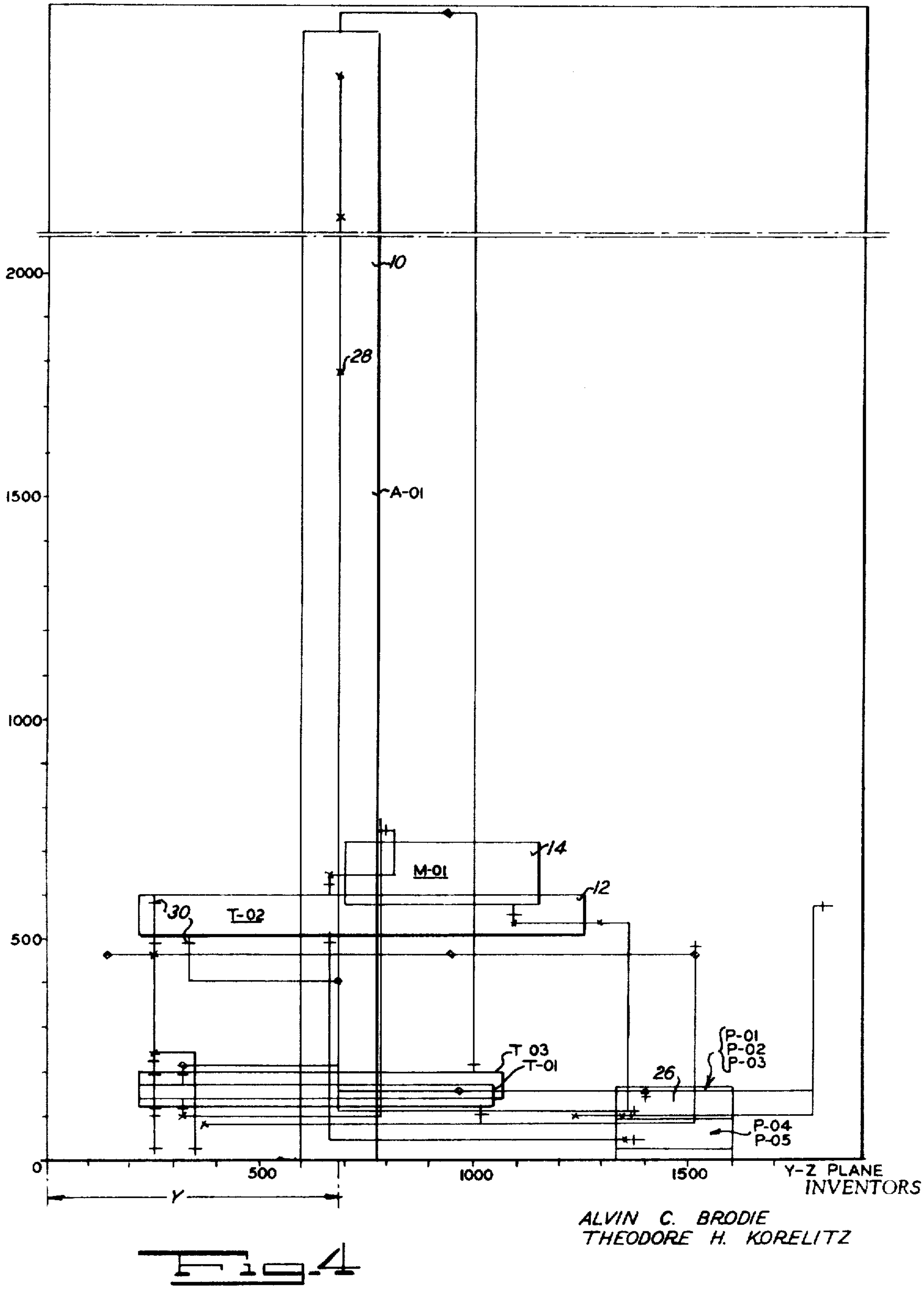
FIG. 4 is the side elevation view in the Y–Z plane corresponding to the piping design of FIG. 2.

Referring to FIG. 3, a section of a solvent extraction system is shown in a computer formed drawing, consisting of a front elevational view in the X–Z plane. The system shown comprises a large distillation column 10, a first heat exchanger 12, a storage tank 14, additional exchangers 16 and 18, and several pumps 20, 22, 24, 26 and 27. The designer-draftsman would normally have identified the tower 10 as A–01, the heat exchanger 12 as T–02, the tank 14 as M–01, the exchanger 16 as T–03, and the exchanger 18 as T–01, and the pumps 20, 22, 24 and 26 and 27 as P–01, P–02, P–03, P–04 and P–05, respectively. The exact mode of operation of such chemical extraction system, while it would need to be known to the draftsman for purposes of piping it, that is, interconnecting the units for proper fluid flow from unit to unit to perform the process intended, is, in the particular process flow illustrated, not essential to the understanding of the present invention. It will be noted that FIG. 2 is a plan view, FIG. 3 is a front elevational view, FIG. 4 is a side elevational view, and FIG. 5 is an isometric view, of the same apparatus elements placed in the relative positions in which they will be fixed into the system, all of these drawings being formable by the computer in combination with a mechanical drafting machine such as an X–Y plotter, according to this invention.

Figure 5:
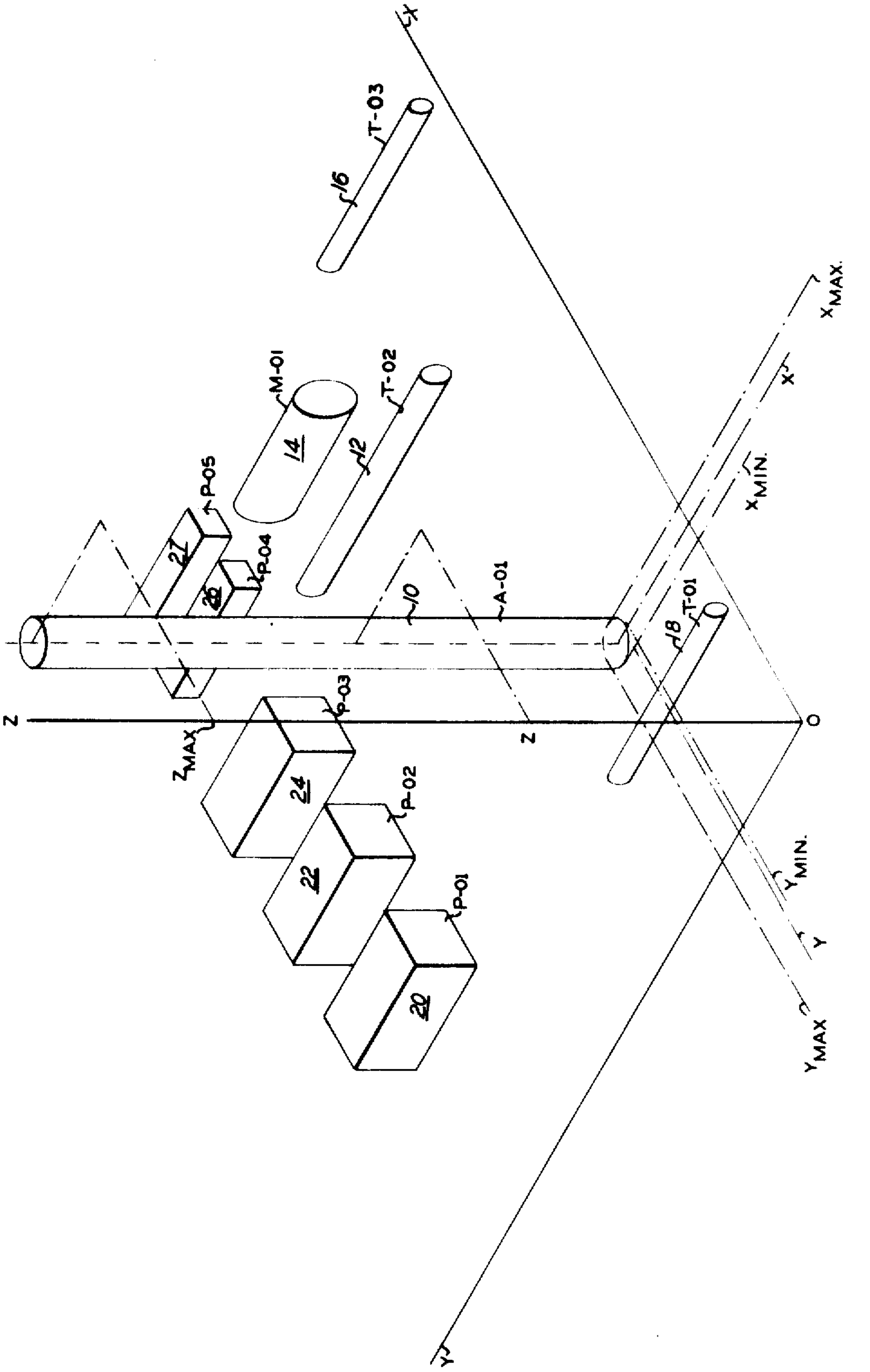

As a first step, illustrated in FIG. 5, the several elements are oriented into a plot plan on crosslined paper graphically, accurately positioning them with respect to an origin 0, and in proper scale, to indicate size, spacing and locations of each unit with respect to others of such system. FIG. 3, an elevation, would show the system layout as the units finally appear interconnected on the X–Z plane; FIG. 2 a plan view, shows a similar drawing of these units as they finally appear in the X–Y plane; and FIG. 4, a side elevational view, shows the Y–Z plane appearance of the several pipes or finally interconnected units as drawn by an X–Y plotter. Purely isometric drawings as in FIG. 5 can also be prepared by a computer drafting device, such equipment obtained from equipment catalogues, or original equipment design drawings are located and distributed on a rough initial drawing, as herein termed a "plot plan." That plot plan locates each unit of equipment three dimensionally with respect to the others as they are intended to be located in the system, and includes center point as well as outline dimensions of each unit as located in the system.

In forming the plot plan, detailed sketches or drawings of each piece of equipment are used which indicate normal orientation of their axes and where the piping connections, nozzles, attach. Each piece of equipment is exactly arranged and oriented on the plot plan with respect to its origin point measuring exact distances to selected scale measured from that origin to the center point of the equipment. The outline dimensions of the emplaced equipment is measured in terms of maximum and minimum dimensions in X-, Y- and Z-directions, thereby establishing the outline dimensions of the equipment in terms of X-, Y- and Z-coordinates.

For purposes of securing approximate measurements of the spacing dimensions and location of the several units of the system, the several units are first located or oriented with respect to each other in a plot plan prepared by a person familiar with the equipment requirements of the unit.

FIG. 5, an isometric view, may be used to illustrate how the spacing and distances for each unit are measured for purposes of determining X-, Y- and Z- location points needed as orienting data for supply to the computer. For instance, FIG. 5 illustrates X-, Y- and Z-emanating from an origin 0. With such orienting plan, FIG. 5, it is possible to measure first a center point of an apparatus unit or element of the system; for instance, the distillation tower 10 (A–01) whose center point is indicated at 28. That center point lies along the X-axis, a distance X from the origin, a distance Y in the Y-direction from the origin and a distance Z in the Z-direction from the origin. This point measured in each direction from the origin gives the numerical X-, Y- and Z-distance coordinates locating the center point of the distillation tower 10 with respect to the origin. Similar measurements suffice to locate the center points of each of the other units in the system, and a layout chart of such points is shown in FIG. 6 which can be a group of input cards for each point or a composite chart for supply to a computer.

The draftsman, in beginning a layout of such system as here described, would not only measure the center points and list the data corresponding to the X-, Y- and Z-coordinates thereof for each of the units to be located in the system, but would also obtain dimensions of the equipment from available drawings prepared by the engineers, and suitably locate such in outline scale dimensions on the drawing. For instance, the tower 10 (A–01) is located a distance X from the center point and has a certain diameter in the X-direction from the origin. As thus measured, the actual size (diameter) as well as location of each of the sides or perimeter of each unit is fixed in the X-direction with respect from the origin as well as to other units of the system. In the same manner, measuring in the Y-direction, a distance Y would measure the same center point and diameter of the distillation tower 10, and in the Z-direction a distance Z would measure the distance above ground level of the bottom of the tower or its lowermost point in the system.

Referring then to FIG. 6, a complete tabular list is shown which can be formed of the center point and outline dimensions which also determines the spacing of each of the units. Such data is obtained from the plot plan drawing. FIG. 6 lists, for example, actual given dimensions with respect to X-, Y- and Z-coordinate center points of each unit. For instance, the tower 10 unit (A–01) is a typical draftsman's designation of a distillation tower 01 and the Z shown following A–01 in FIG. 6 indicates that the unit has its long axis parallel to the Z-axis, thereby to approximately orient and define its vertical position. A typical preliminary plan for A01Z as shown in FIG. 6 would then designate its center point coordinates, the X-distance (672), the Y-distance (688) and the Z-distance (1456) of the center point from the origin. Similarly, the dimensions, for instance, the diameter of the tower 10 (A01Z) in the X-direction may be listed as 172. The tower being vertical and cylindrical, it would have the same dimension 172 in the Y-direction, and it has a height of 2912, the Z-direction.

For illustrative purposes, typical orienting data for units to which the tower A–01Z will be interconnected by piping is given for the heat exchanger T–01 and T–02. Since their long axes are parallel the Y-axis, it is more fully designated as T–01Y, and T–02Y. Similarly, X-, Y- and Z-center point dimensions are listed in FIG. 6 as 384–640–144 for T–01Y, and 1008–744–554 for T–02Y. Again, the dimensions are given for these heat exchangers in the three dimensions, X, Y and Z as 48–832–48 for the cylindrical heat exchanger T–01Y which will be understood thereby to be 832 units in length (or at a scale of 4 units per inch, 17 feet 4 inches long) in the Y-direction, and 48 inches in the same scale reduction becomes 12 inches in diameter; and similarly for T–02Y the dimensions are 88–1040–88, of which 88 units (or 1 foot 10 inches) is the diameter and 1,040 units (21 feet 8 inches) is the length of the Y-direction.

For purposes of manipulating this data within the computer, the center point locations and dimensions are listed in FIG. 6. They are dimensions of each unit to determine the relative spacing of the sides, top and bottom of the complete unit as it is placed in the memory of the computer. That data, as given in FIG. 6, however, is transposed by the computer to a number series, shown in FIG. 7, which are detailed algorithms, a data form usable by the computer. The entire tabular data compilation of FIG. 7 is an arrangement of the several units of the system in terms of combination algorithms significant of the system. It is a machine-compiled list of data points from which the computing machine proceeds to make further linear computations, as will appear.

As shown in FIG. 7, the tower 10 heretofore indicated with the letter A in draftsman's language indicative of a tower, is given a numerical designation 41, which in the computer language would then be identifiable to the computer as a tower. The number of the tower, identifying this particular tower which may be 01 is continued, and that number is retained by the computer. The axis orientation Z of the tower is also converted by the computer to a number, i.e., the number 3, indicative to the computer of a Z-axis. Similarly, the axis letter Y is converted to a number 2 and an axis orientation X may be numbered 1. Consequently, the tower 10 in draftsman's code identification is so designated in FIG. 6 as A–01Z, and becomes 41013, the numerical designation of said tower as transposed by the computer. Similarly, the heat exchangers 12 and 18 which would be designated by the piping draftsman in his code as T–01Y and T–02Y, are reidentified by the computer as 63012 and 63022, from which again it will be understood the first digit 63 identifies a heat exchanger, the 01 and 02 respectively identify the particular units, and the 2 identifies the layout as parallel to the Y-axis.

The center point dimension X for each unit is replaced in the computations of the computer by perimeter dimensions measured in the X-direction from the origin as X-min. and X-max., respectively designating the near and far points of the tower measured from the origin in the X-direction In the same way, the Y-center point data of FIG. 6 is restated by the computer in FIG. 7 as Y-min. and Y-max. in the algorithmic form, the numbers orienting and measuring the near and far distances of each point from the origin in the Y-direction. The same measurement is made as Z-min. and Z-max. in the Z-direction. In this manner all of the boundary dimensions of each of the units comprising the system are converted into a table of algorithms as shown in FIG. 7. Hence, this table comprises the three-dimensional orienting data which establish the outline or boundary dimension form of each unit, its identification, as well as its size and spacing in the system, all coordinated graphically in three dimensions with respect to the origin.

Thereafter the algorithm table, FIG. 7, formed in the computer per se, can be transposed to visible typewritten form or placed on magnetic or punched tape form, as can be conveniently used with the particular computer to be used, and the output data is stored for future use, but it is most usually stored in the memory of the computer. Consequently, the computer then has in its memory the complete X-, Y- and Z-component measurement points comprising the total outline perimeters, sides, tops and bottoms, locations of each unit as they are to be emplaced; that is, as they are positioned to be interconnected, integrated, into the fluid transfer or other linearly interconnected system.

As the next step, for purposes of interconnecting the several units, the exact points where lines (pipes) are to connect with each unit are similarly oriented in typical three-dimensional orienting form, first locating the exact site or sites upon each unit which is to be the inlet or outlet terminal site of a connecting pipe or line to or from the unit. The connecting site of a line or pipe with a unit is commonly referred to as a "nozzle." For instance, referring to FIG. 3, it will be noted that the tower 10 has little crosslines (⊢) 30 which are draftsman's symbols for such nozzles or points where inlet or outlet pipes connect to the unit as seen from the side or as small circles (o) 31 when viewed from the front. These very points of connection 30 are read into the memory of the computer as three-dimensionally oriented points with respect to the graphic origin, in the same manner as described above for the units themselves, and are converted to the same algorithmic form as described for other machine produced locating data of FIG. 7. For instance, each point of connection must be identified by a number significant of the point as well as its X-, Y- and Z-coordinates to locate the point of connection upon the unit to be interconnected therewith. Moreover, that identifying number for a connection can be used in duplicated form upon the remote destination nozzle which is to be interconnected by the same pipe or line, or the same result can be obtained by a specific sequence of numbers which can be so identified by the computer. Thus, the identifying indicia may also supply a number significant to the computer to distinguish between a starting nozzle and a destination nozzle so that the machine when asked to compute the passageway between one nozzle and another will know where the path to be computed begins and where it ends.

The procedure is further illustrated isometrically in FIG. 5 wherein the several units are shown suitably positioned one with respect to the next. The plot plan data is measured in suitable scale size from the origin to the several centerlines of each unit together with the dimensions of each unit, and these are entered as a chart upon cards as shown in FIG. 6, or tape, or typed upon sheets, etc. The data of the charts is then fed to the computer, which converts the same to algorithmic form as formed, and identifying numbers used and set forth by the computer in FIG. 7. This algorithmic data, it will be noted, is numerical identification and the actual three-dimensional locating data of the critical peripheral or perimetrical dimensional boundaries in terms of maximum and minimum boundary limits of each unit with respect to the origin.

The computer, then, as a next step, has programmed into its memory certain line limits. For instance, this may be a chemical plant for which it is desired to have a free area through which no pipes pass so that people can walk or automobiles can drive through the area. A limit for this is read into the computer; for instance, that all pipe lines shall pass at least 10 feet above ground level. All Z-dimensions of computed paths are thus made to exceed 10 as a lower height limit in certain X- and Y-areas, which is read into the computer in this manner as a limit.

The computer may further have read into it various other desired memory limits which will limit its paths for any of many purposes as listed above. It may have, for instance, as a most usual line limit, that each line shall pass only in X-, Y- or Z-directions (never diagonally) to establish a symmetry or orderliness in the piping. The computer for this purpose is asked first to perform its connections of listed pairs of nozzles first in the X-direction then in the Y-direction and finally in the Z-direction, always moving from the initial point closer to the final point and without more than two changes of direction. This is only an opening gambit, and interferring limits will often require other sequences of directions, as well as more than two changes of direction.

The manner in which the computer actually fixes the several lines or passageways is illustrated in simple diagram in FIG. 8. That figure illustrates by numerous passageways the computation of passageways, selecting from several alternate paths of a passageway from the point A to the point B. The dotted cubical (or rectangular prism) construction illustrates six different ways for this movement from A to B. The computer will perform one or all six path computations, moving as indicated first in the X-direction then in the Y-direction and finally in the Z-direction to effect the connection from A to B, moving in that sequence, starting with the first and switching to the next when some limit programmed into the machine is reached, changing as often as necessary, until a free path within the imposed limits is found. The limit may, for instance, be some other blocking pipe or unit. Hence, if asked first to proceed in an X-direction the computer may find a blocking limit obstructing X-direction movement, whereby it will then proceed in a Y-direction as an alternate or possibly in a Z-direction as an alternate, depending upon the presence or absence of an obstruction. Various additional limits as described above and usually including that the path shall be the shortest one between the points A and B may be imposed. For illustrative purposes herein the arbitrary limit that the path shall be that of a pipe which may not pass within 3 inches of any other object contained in the defined space is imposed. If none of the six primary points is open, the path can move in a negative X-, Y- or Z-direction until some obstruction or limit is cleared before then passing in the preferred X-, Y- and Z-positive directions.

As shown in the diagram of FIG. 8, the starting point A, the movement through the six primary paths may be $$A \rightarrow A_{10} \rightarrow A_4 \rightarrow A_5 \rightarrow B$$
$$A \rightarrow A_{10} \rightarrow A_1 \rightarrow A_2 \rightarrow B$$
$$A \rightarrow A_{11} \rightarrow A_6 \rightarrow A_5 \rightarrow B$$
$$A \rightarrow A_{11} \rightarrow A_7 \rightarrow A_3 \rightarrow B$$
$$A \rightarrow A_{12} \rightarrow A_8 \rightarrow A_2 \rightarrow B$$
$$A \rightarrow A_{12} \rightarrow A_9 \rightarrow A_3 \rightarrow B$$

Obviously the number of possible movements to define a pathway available by combining both positive and negative would be greatly increased. These paths each involved at least three changes in direction, each segment of the path being parallel to an X-, Y- or Z-direction.

In proceeding for testing the various paths of the selected pipe, the computer scans each segment in sequence for interference with any existing equipment within 3 inches of the pipe segment whose path is to be determined, or other segments already determined and set forth in a table and read into the memory of the machine as from FIGS. 6 or 7. The first segment of the path is tested first. If there is no such interference with the first segment, then the second segment of that path is tested. If there is interference in any of the three segments of any path, that path is bypassed and another of the five remaining paths as listed above is then tried. As soon as all three segments of any path are found to be satisfactory, an exit is made from the testing routine, the satisfactory path is then stored in tables similar to that of FIG. 7, indicating the identification of a satisfactory path numerically identified in terms usable by the computer. The program control then continues to the beginning of the routine for the next line to be determined for interconnecting the next pair of points.

Figure 11:
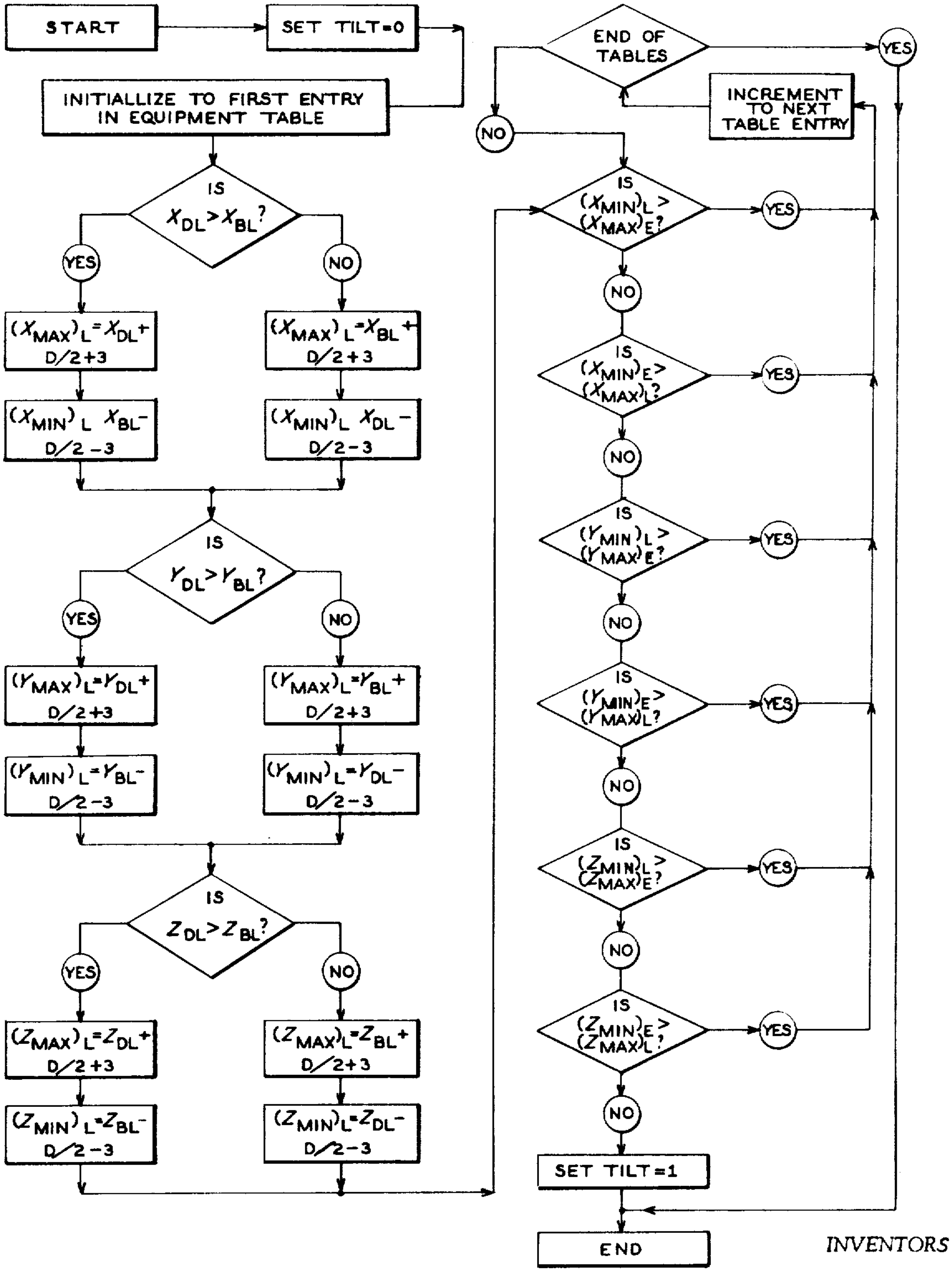
FIG. 11 is a detail of FIG. 10 procedure illustrating computer routine for checking interferences.

The method used by the system to check for each interference with a pipe segment having the above-stated 3 inch clearance limit is further described by the block diagram of FIG. 11. As shown in FIG. 11, a diamond-shaped block is used to indicate a test with either a "yes" or "no" response; a rectangular block is used to calculate all internal transmission steps; and a rectangular-shaped block to indicate the start and finish of the particular test routine. The arrows and lines connecting the blocks indicate the logic and steps used in execution of the program.

It is assumed that the several pieces of equipment of the system to be interconnected are presented in the form represented by FIG. 6 and stored in the computer memory in the form illustrated by FIG. 7. The area occupied by each piece of equipment is defined in these tables and in the computer memory by the dimensional coordinates $Xmin_e$, $Ymin_e$, $Zmin_e$, $Xmax_e$, $Ymax_e$, and $Zmax_e$, wherein the "*e*" refers to equipment. The start of each line segment, the nozzle location, is defined by the point $X_{BL}$, $Y_{BL}$ and $Z_{BL}$ where the subscript "B" signifies the beginning or starting point, and "L" indicates that the point references a line segment. The end of the line segment is defined by the point $X_{DL}$, $Y_{DL}$ and $Z_{DL}$, the subscript "D" being significant of the destination point of the segment. The symbol "D" refers to the pipe diameter.

A memory location, referred to as "TILT" is established as an indicator which internally informs the machine of the presence or absence of interference as defined by the programmed limit between the line segment and the equipment. When this memory location is found to contain a 0, it is indicative of the fact that the line segment does not pass within, exceed or violate the specified 3 inch limit of any piece of equipment; that is, the line is acceptable according to this imposed limit. When it contains a 1, it indicates that the specified limit has been violated in at least one instance.

In following the program as outlined by FIG. 11, the procedure is first to set TILT to equal 0. The three-dimensional area comprising the pipe dimensions and clearance is established to represent the line segment. Two of the dimensions of this area are equivalent to the pipe diameter plus the selected 3 inch specified clearance and the third dimension is equivalent to the line segment length plus the pipe diameter plus the clearance. This area is defined on the block diagram by the dimensional coordinates $Xmin_L$, $Ymin_L$, $Zmin_L$, $Xmax_L$, $Ymax_L$, and $Zmax_L$ (the subscript "L" referring to line segment).

Figure 10:
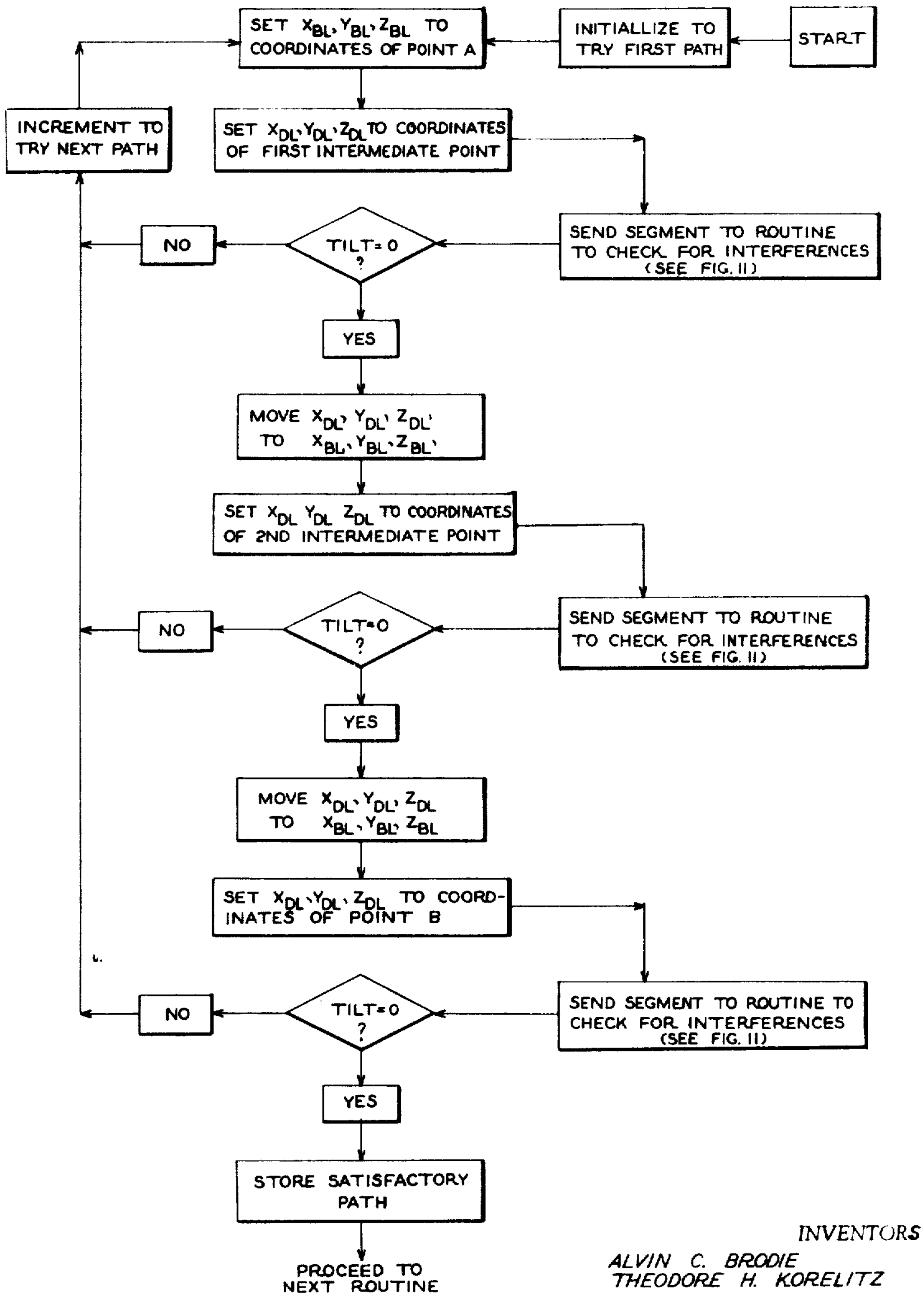
FIG. 10 is a diagram illustrating the typical operation of a computer to draw a line with imposed limits.

Proceeding further to execute the program the dimensional coordinates of the line segment area are then calculated from the starting point ($X_{BL}$,$Y_{BL}$,$Z_{BL}$), the destination point ($X_{DL}$,$Y_{DL}$,$Z_{DL}$), the pipe diameter (D), and the specified clearance limit (in this case 3 inches). The program then proceeds to perform six tests of the line segment with respect to each piece of equipment following the detailed steps as set forth in FIG. 11; these tests determine whether the three-dimensional area established for the line segment touches the area occupied by the piece of equipment on any of its six sides. If a space is not found between the two areas on all six sides, a 1 is transferred to TILT, replacing the 0 originally located there, and control is transferred back to the portion of the program which called for the interference check (FIG. 10). If all the tests are satisfied, another piece of equipment is tested; and so forth, until either an interference has been detected or all the equipment has been tested. If all the equipment is tested and no interference is found, control is transferred back to the calling program with a value of 0 remaining in TILT; thus signifying that the line segment clears each piece of equipment by the specified limit.

Assuming that the computer has been programmed with various limits including that the line A–B of FIG. 8 may not pass closer than 3 inches to any other line (as described in FIG. 11), the routine to determine a proper path for this individual line is explained further in the diagram of FIG. 10. This diagram merely sets forth a typical routine which an experienced computer programmer will recognize according to the following description of how the point A and B of the diagram illustrated in FIG. 8 are interconnected by a line of three segments by operation of the computer.

As shown in FIG. 10, the coordinates $X_{BL}$,$Y_{BL}$ and $Z_{BL}$ locating the initial point A and then the terminal coordinates $X_{DL}$,$Y_{DL}$ and $Z_{DL}$ are set, defining between them the first line segment $A_{10}$. That segment $A_{10}$ then has a routine check made for interference by a scanning procedure with the steps outlined above and shown in FIG. 11.

The memory location referred to as TILT is set to be equal to 0 if no interference is encountered for the particular segment, according to the imposed limits, and equal to 1 if interference is, in fact, found for the segment. The 1 and 0 conditions, the presence or absence of interference, are indicated by the blocks "no" and "yes" respectively in the FIG. 10. Thus, when an interference is found, the signal is returned for a reset of the line segment extending from the initial point A for testing in some other (Y or Z) direction; for instance, by next testing a line segment $A_{11}$. The beginning and terminal coordinates of the line segment $A_{11}$ are then set into the machine and the described test procedure is repeated to again determine interference for the new line segments.

On the other hand, if no interference is first found in the routine check of segment $A_{10}$, TILT, being 0, then the procedure conditions for determining interference of a second line segment is begun. The beginning of the second segment $A_4$ is the same as the terminal coordinates of segment $A_{10}$; that is, the coordinates $X_{DL}$, $Y_{DL}$ and $Z_{DL}$ of $A_{10}$ are reset as the new initial coordinates $X_{BL}$, $Y_{BL}$ and $Z_{BL}$ of the segment $A_4$. Similarly, its terminal coordinates are $X_{DL}$, $Y_{DL}$ and $Z_{DL}$ and identify the second intermediate terminal point of the second segment $A_4$. The scanning procedure for segment $A_4$ routine is repeated. Again, assuming TILT equals 1, that is, if the "no" block controls and interference is indicated, the routine returns to the beginning of line segment $A_4$ (end of segment $A_{10}$) to attempt another direction; for example, the direction of line segment $A_1$ and the intermediate procedure described above is repeated.

On the other hand, if TILT equals 0 is found as the result of that routine interference check for line segment $A_4$; that is, no interference was found for the $A_4$ segment, then the block "yes" will control and the next segment $A_5$ has its start and terminal coordinates set up for interference check. This is done as before. The terminal point $X_{DL}$, $Y_{DL}$ and $Z_{DL}$ of segment $A_4$ becomes the initial point $X_{BL}$, $Y_{BL}$ and $Z_{BL}$ to define the beginning of the segment $A_5$ and the point B coordinates $X_{DL}$, $Y_{DL}$ and $Z_{DL}$ become the coordinates identifying the terminal of line segment $A_5$. A final routine scanning check of that line segment $A_5$ is then made through the interference routine checking procedure and as before if TILT equals 1 and the block "no" controls, the computer is returned to attempt a different direction from the terminal end of segment $A_4$ as its initial position. That new direction may be changed to the segment $A_6$ rather than $A_5$, so that the terminal point thereof, $X_{DL}$, $Y_{DL}$ and $Z_{DL}$ will then be the coordinates at the intersection of segments $A_{11}$ and $A_6$ and then proceed by way of segments $A_7$ and $A_3$, or it may at this point be better to return to the start of the series to try segment $A_{11}$ as the initial segment for combination with $A_7$ and $A_3$. Possibly it may be necessary to move in a negative direction but the procedure proposed by the computer to draw a line from the point A to B will be apparent.

EXAMPLE I

To further illustrate the program flow charts presented in FIG. 10 and 11, reference is made to the diagram shown in FIG. 8 of the steps needed to be performed in passage from point A to point B. The actual data accumulated in the procedure is set forth in tables FIGS. 12, 13 and 14. For instance, the point A is a point on a piece of equipment designated in the equipment table as *p–81–x* and point B to be connected to point A is a point on a piece of equipment designated as *m–26–z*. Thus, this example illustrates arbitrary data as obtained in passing from point A to point B of FIG. 8. As a first step following the procedure of FIG. 10, the coordinates of point A are transferred to the memory locations specified as $X_{BL}$, $Y_{BL}$ and $Z_{BL}$. The coordinates of the first intermediate point (see FIG. 13) are transferred to $X_{DL}$, $Y_{DL}$ and $Z_{DL}$. Therefore:

| | |
|---|---|
| $X_{BL}$ = 117.0 | $X_{DL}$ = 290.0 |
| $Y_{BL}$=240.0 | $Y_{DL}$ = 240.0 |
| $Z_{BL}$ = 42.0 | $Z_{DL}$ = 42.0 |

The segment defined by these two points in space is sent to the routine to check for interference. Upon returning, the variable TILT is tested for a value of 0. If TILT contains a 0, the values in $X_{DL}$, $Y_{DL}$ and $Z_{DL}$ are moved to $X_{BL}$, $Y_{BL}$ and $Z_{BL}$ and the coordinates of the second intermediate point (see FIG. 13) are moved into $X_{DL}$, $Y_{DL}$ and $Z_{DL}$. Therefore:

| | |
|---|---|
| $X_{BL}$ = 290.0 | $X_{DL}$ = 290.0 |
| $Y_{BL}$ = 240.0 | $Y_{DL}$ = 352.0 |
| $Z_{BL}$ = 42.0 | $Z_{DL}$ = 42.0 |

A check is again made for interference. If TILT =0, $X_{DL}$, $Y_{DL}$ and $Z_{DL}$ are transferred to $X_{BL}$, $Y_{RL}$ and $Z_{BL}$. The coordinates to point B are then moved into $X_{DL}$, $Y_{DL}$ and $Z_{DL}$. Therefore:

| | |
|---|---|
| $X_{BL}$ = 290.0 | $X_{DL}$ = 290.0 |
| $Y_{BL}$ = 352.0 | $Y_{DL}$ = 352.0 |
| $Z_{BL}$ = 42.0 | $Z_{DL}$ = 550.0 |

A third check for interference is made and if TILT =0, the coordinates of the good path are stored on the disk file. If, during any of the interference tests, an interference is discovered, TILT will have a value unequal to 0 and control will be transferred back to the second step for the next path, i.e., A–$A_{10}$–$A_1$–$A_2$–B. Each segment which is sent to the interference routine is scanned in accordance with the program steps shown in FIG. 11. Thus, considering the first segment of the first path tried, that is, the segment from point A to the first intermediate point of the first path, the coordinates of these points have been set up in $X_{BL}$, $Y_{BL}$, $Z_{BL}$, $X_{DL}$, $Y_{DL}$ and $Z_{DL}$ as described. At the start of the interference routine a value or zero is assigned to the location TILT and a pointer is set to the first entry in the equipment table (FIG. 12) which has been established previously as described by FIGS. 6 and 7. Next, the value of $X_{DL}$ (290.0) is compared to the value of $X_{BL}$ (117.0). It is found to be larger than $X_{BL}$; then $(X\text{min})_1$ and $(X\text{min})_L$ are calculated from the relationships:

$$(X\text{max})_L = X_{DL} + D/2 + 3$$
$$(X\text{min})_L = X_{BL} - D/2 - 3$$

and since the diameter, $D$, as noted on FIG. 14 is 10 inches, the values of $(X\text{max})_L$ and $(X\text{min})_L$ are calculated as:

$$(X\text{max})_L = 290.0 + (10/2) + 3 = 298.0$$
$$(X\text{min})_L = 117.0 - (10/2) - 3 = 109.0$$

Next, $Y_{DL}$ is compared to $Y_{BL}$ and found to be not greater than $Y_{BL}$, so $(Y\text{max})_L$ and $(Y\text{min})_L$ are calculated as:

$$(Y\text{max})_L = Y_{BL} + (D/2) + 3 = 240.0 + (10/2) + 3 = 248.0$$
$$(Y\text{min})_L = Y_{DL} - (D/2) - 3 = 240.0 - (10/2) - 3 = 232.0$$

Similarly, $(Z\text{max})_L$ and $(Z\text{min})_L$ are calculated as:

$$(Z\text{max})_L = Z_{BL} + (D/2) + 3 = 42.0 + (10/2) + 3 = 50.0$$
$$(Z\text{min})_L = Z_{BL} - (D/2) - 3 = 42.0 - (10/2) - 3 = 34.0$$

Consequently, this program has prepared six coordinates which define the limits of a block of space containing a piece of pipe running between point A and the first intermediate point of the first path. These coordinates together with all of the other coordinates of all segments of the six possible paths are shown in FIG. 14. The next portion of the interference routine illustrated in FIG. 11, performs the tests to determine if the special block thus created to represent the piece of pipe from point A to the first intermediate point passes through or touches any of the special blocks representing the individual pieces of equipment shown in FIG. 12. At the beginning of this portion, the program will be scanning the coordinates of the first piece of equipment, *p–81–x*. The coordinates in question are:

| | |
|---|---|
| $(X\text{min})_L$ = 109.0 | $(X\text{min})_E$ = 130.0 |
| $(Y\text{min})_L$ = 232.0 | $(Y\text{min})_E$ = 228.0 |
| $Z\text{min})_L$ = 34.0 | $(Z\text{min})_E$ = 27.0 |
| $(X\text{max})_L$ = 298.0 | $(X\text{max})_E$ = 165.0 |
| $(Y\text{max})_L$ = 248.0 | $(Y\text{max})_E$ = 252.0 |
| $(Z\text{max})_L$ = 50.0 | $(Z\text{max})_E$ = 57.0 |

The six tests that are performed are specifically designed to test for the situation where one of the blocks of space is beyond the spacial limits of the other. When this situation is discovered on any of the six tests, it is indicative of the fact that there is no interference between the two blocks and no further testing of the particular two blocks is required. The pointer is incremented to the next piece of equipment and the tests repeated until either an interference is detected or all pieces of equipment have been scanned against the segment block without detecting an interference. An interference can be considered to exist when at least one of the two limits along each axis of one of the blocks falls within the limits of the corresponding axis of the other block; or, in terms of the tests performed, when none of the six coordinates of one of the blocks is outside the limits of the other block. The tests are performed as follows:

(1) Is $(X\text{min})_L$ GREATER THAN $(X\text{max})_E$
109.0 165.0 No, then
(2) Is $(X\text{min})_E$ GREATER THAN $(X\text{max})_L$
125.0 298.0 No, then
(3) Is $(Y\text{min})_L$ GREATER THAN $(Y\text{max})_E$
232.0 252.0 No, then
(4) Is $(Y\text{min})_E$ GREATER THAN $(Y\text{max})_L$
130.0 248.0 No, then
(5) Is $(Z\text{min})_L$ GREATER THAN $(Z\text{max})_E$
34.0 57.0 No, then
(6) Is $(Z\text{min})_E$ GREATER THAN $(Z\text{max})_L$
27.0 50.0 No, then an interference is indicated and the variable TILT is assigned a value of 1. Control is returned to the program which sent the points to the interference routine. Note that the segment $A_{10}$, actually passes through the piece of equipment, *p–81–x*. In a similar way, the second, third and fourth paths would find interferences: segment $A_{10}$ of the second path with *p–81–x*; segment $A_6$ of the third path with *m–26–z*; and segment $A_3$ of the fourth path with *m–26–z*. The fifth path, however, will find no interferences with the equipment and it will be accepted and stored. Note that in the testing of the segments for the fifth path, segment $A_{12}$ of path 5 (see FIG. 15) on the second test against *p–81–x*, $(X\text{min})_E$ will be greater than $(X\text{max})_L$:

130.0>125.0 Yes; and also on the second test against *m–26–z*, $(X\text{min})_E$ will be greater than $(X\text{max})_L$:

258.0>125.0 Yes

Also, the other two segments, $A_8$ and $A_3$, of the fifth path would find a similar response to one of the six tests with each piece of equipment.

The following is the actual machine language program derived from the FORTRAN program and compiled specifically to operate on the IBM 1620 computer. Said machine language program corresponds to the flow charts of FIGS. 10 and 11 and augments these figures to include the means for adding the segment of lines which have been scanned and found to satisfy all the imposed limitations, to the end of the table illustrated in FIG. 7, wherein they become limiting exclusions for subsequent lines.

```
36000840050036001560050036002560050036003280050034000000010249000840000000—00001
3600000005004900000000000000000001100158000P21100275000-11100170000—236-100—00002
0000050024-1079002754700256012001400158-30164700116013004901000000000000000—00003
39000130010034-0000701024800000000000490015200123456789123456789-2345678900—00004
-J3456789-JK456789-JKL56789-JKLM6789-JKLMN789-JKLMNO89-JKLMNOP9-JKLMNOPQ00—00005
49001520000043415944005664630056460062455864455543450
46010120140046010240090015-40010000
1701120-10844101224-10961601302-00004901322000001101315000-136002010050000—00008
2401315002804601188012001701284-001349011320450111R002631701284-2747490100—00009
13200000430126000263430126000262440122L002621701284-2783490113200000390100—00010
28L0010034000000010248-000350000424401784002624301454002621601999-02011100—00011
01999000-41701976000-01101999000-145013580199R2100274013022100269013022400—00012
0026900414460146601300270266026651701120-14784302026002634501322002622100—00013
00217013021701562-1728460171601200310162J002014901466000001601621-39921600—00014
0163300J011101621000-91201633000-1450162400000421101621000J1240162J0021200—00015
460158601400470158601200490156J00000390168L00100480000-0000049016960170100—00016
684-28971101621000-526017750162J3201775-0000160021P00000490146604301406000—00017
02622100274013022401763002744601844013002601763002741601975-02011601999-00-00018
02071701964-18801101975000-11101999000-51701964-19161101999000-71101975000-00019
00J145018680197N490141800000440196L000001502013000014402012000001502013000—00020
0002210199R01302426004700176346024620090036002010050045024060026314002100—00021
2-00004602110014004602462012002601315002802601302004701201302J200017015600—00022
2-22223600201005004502202002631701284-274749021580430203800263490215802400—00023
0022200402470227001200240022400404460229012001701284-28334902050011016200—00024
1000-62702704027031201621000-132001621000001701120-23501701224-236226023900-00025
700269210239701302160162J0000049017960320027500000240170700280460146201200—00026
001701284-2941490203801502461000001602497-40014502550000004302530024611700—00027
01284-2993490008401701284-3027490205002602609024971102497000J450264602400—00028
9P1502461000013103084000001603100-0000390308500100340000000102110249700000-00029
--34902486025027010027M310026R00201150027M00000M245021580162J150162J0000000—00030
420000000000000000045676359410048454144455900434159440
5655004341594400544962624955470
59455563004600565900520
63594100434159440041630045554400564600444543520
495545620
-8-5J2372N8314
2P-1430J2060KOJ2340J2040J3J2340 J01J-0099J214032-0095-0000
27-1522—0099
```

```
J1J2340-0-01KMJ2340J2045M7J239601100
KOJ2345J2040J3J2345 J01J-0099J217032-0095-000027-1522—0099
J1J2345-0-01KMJ2345J2045M7J249201100
17-1522N832417-1780 -02P-1430J2070KOJ2340J2040KOJ2345J2040
J3J23450-0062J00099J23402600039000991300039-00-N
1K-0099J217032-0095-000027-1522—0099
J1J2345-0-01KMJ2345J2045M7J26360110
J1J2340-0-01KMJ2340J2050M7J262401100
17-1780 -02P-1430J208017-1522M832 R KOJ2340J2040KOJ2345J2040
J3J23450-0202J00099J23402600039000991300039—00J0
11-0099N813932-0095-000027-1522—0099
J1J2345-0-01KMJ2345J2055M7J285201100
J1J2340-0-01K4J2340N8329M7J284001100
17-1780 -0M9J208N—0000
J3027
-2282-04-6038-02-2282-04-3218-06-1-2164
J3056
-6-2064
J3035
J3084
M9J206N --0000
J3091
-3218-06-1-2164
J3096
-7—2064
J3091
J3124
M9J207N—0000
J3131
-2282-04-2164
J3136
J8-2064
J3131
J3162
KOJ2340J2040KOJ2350J2040
J3186
J3J2350 J011-0099N996932-0095-000026-0485-00991P—9586J3263
M9J3264—0000
J3J2350 J01J-0099J214032-0095-000027J0898-00992—P6676J3263
J1J2350-0-01KMJ2350J2045M7J318601100
KOJ2355J2040KOJ2350J2040
J3384
J3J2350 J011-0099N993932-0095-000026-0485-00991P—9586J3263
J3J2350 J011-0099N996932-0095-000027J0898-00992P--6676J3263
J1J2350-0-01KMJ2350J2045M7J338401100
J3J23550-0062J00099J23402600039000991300039-00-5
1J-0099J217032-0095-000027J0898-00991P-6676J2360J3J2360 J0
11-0099N993932-0095-000026-0485-00991P-9586J3263J3J2360 J0
1J-0099J217032-0095-000027J0898-00992P-6676J3263JPJ237—J3767
17J0898N833917-6676—0485
M3J3816-0476M9J211N00000M4J211--0483M9J211--00000
J3836
KOJ2365J2040
J3848
J3J2365 J011-0099N996932-0095-000026-0485-00991P—9586J3263
J3J2365 J011-0099N993932-0095-000027J0898-00992P—6676J3263
J1J2365-0-01KMJ2365J2045MJ384801100
M9J212N--0000
J4016
M9J209--0000
J4028
J3J2355 -51J-0099J229032-0095-000026-0485-00991P—9586J3263
1PJ0898J23602P-6676J3263
J4112
J3J2355 J01J-0099J230532-0095-000026-0485-00991P-9586J3263
J3J2360 J011-0099N993932-0095-000027J0898-00992P--6676J3263
J1J2355-0-01KMJ2355J2045M7J337201100
M9J213—0000
J4280
J1J2340-0-01KMJ2340J2050M7J317401100
J4316
2P-0986J2135KOJ2355J2040J3J2355 -N1K-0099J229032-0095—0000
27-1522-0099J3J2355 J01J-0099J230532-0095-000027-1522—0099
J1J2355-0-01KMJ2355J2045M7J434001100
17-1780 -0M9J214--0000
J4491
-1812J10-0M7N6N6M4-0M7N9M9N4M1N9O8-0N7M1O3N8—0M2M5N3N606
-0M9O2-0O2O3N6N9M5M4-0M9N5-0N4M1O2O3M5N9-0N3M9N5M5—0O3M1
M2N3M5-1586-2282-08-3218-07—1J1322
J4619
-3--2064
J4614
J4656
34-0000-010239-0417-010048-0000-0000M9J4656-000048-0000—0000
M9J4704—0000
000000000000000000000000000000000000000000000000
-0001-0003-0006-0008
-00000O24547J2370
000000000000000000000000000000000000000000000000000000000000J00000000000—00127
00000024547000000000-8-5000000000000000000000000000000000000
J1J2251 -11PJ0898J204517-6676N8339KOJ2230J2050J3J2230 J0
11-0099N993932-0095-000027J0898-0099J3J2230 J011—0099N9969
32-0095-00001P-9586J2413M9J2414—0000
27J0898-00991PJ0330J241317-6676—0485
M3J2474-0476M9J210N00000M4J210N-0483M9J210—00000
J2494
J3J2230 J01J-0099J219532-0095-000026-0485-00991P—9586J2413
J3J2230 J011-0099N993932-0095-000027J0898-00991P—9586J2631
M9J2632—0000
17J0898N83241PJ0574J20651P-9826J26311P-9826J20752P—6676J2413
J3J2230 J01J-0099J216532-0095-000026-0485-00991P—9586J2413
J3J2230 J011-0099N996932-0095-000027J0898-00991P—9586J2631
17J0898N83241PJ0574J20651PJ0330J26311P-9790J20752P—6676J2413
M9J209N—0000
J2884
J3J2230 J01J-0099J219532-0095-000026-0485-00991P—9586J2413
J3J2230 J011-0099N996932-0095-000027J0898-00991P—9586J2631
17J0898N83241PJ0574J20651P-9826J26311P-9826J20752P—6676J2413
J3J2230 J01J-0099J216532-0095-000026-0485-00991P—9586J2413
J3J2230 J011-0099N993932-0095-000027J0898-00991P—9586J2631
17J0898N83241PJ0574J20651PJ0330J26311P-9790J20752P—6676J2413
J3244
```

```
J1J2230-0-01KMJ2230J2055M7J230001100
KOJ2235J20501PJ0898J20551P-6676J2240KOJ2245J2050J3J2245 J0
1J-0099J216532-0095-000027J0898-00992O-0059J22402J—0059J2050
13-00590-0202J00099J22352600039000991300039—00J0
11-0099N813932-0095-00001P-0586J241327J0898—00991PJ0330J2413
17-6676-0485
M3J3544-0476M9J212-00000M4J211—0483M9J212—00000
J3564
J3J22400-0202J00099J22352600039000991300039—00J0
11-0099N813932-0095-000027J0898-0099J3J2245 J01J—0099J2195
32-0095-00001P-0586J241327J0898-00991PJ0330J241317-6676—0485
M3J3756-0476M9J211N00000M4J211--0483M9J211N00000
J3776
1PJ0898J22401P-7290J20801P—6676J2240
J1J2245-0-01KMJ2245J2055M7J332801100

1PJ0898J200017-6676N8339N9J212N—0000
J3884
J1J2235-0-01K4J2235N8329M7J329201100
17J0898N833017-6676—0485
M3J3968-0476M9J213-00000M4J212N-0483M9J213—00000
J3988
2P-0986J213517-1780 -0M9J214N—0000
J4024
2P-0986J215017-1780 -0M9J214—0000
J4055
-1812-82-0O3M9N3O3-0L3-0P0-0M8M5N5M3M5K3N5N6-0M9N5O3M6—3
K3O2O3N6N9M5-0M7N6N6M4-0N4N6O5M5-3-1586—2064
J4055
J4162
M9J215N—0000
J4169
-1812J02-0O3M9N3O3-0L3-0P1-0M8M5N5M3M5K3M9N5O3M6—3N7N9M5
O2M5N5O3K3O3N9O8-0N5M5O7O3-0N7N9M9N4M1N9O8-0N7M1O3M8-3—1586
-2064
J4169
J4296
J4296
M9J225J-000048-0000-0000M9J4308—0000
-0000000R R-0001-0003K0000000-1L0000000-1-0002J0000000—1
000000000000000000000000000000000000000000000000000000001J00000000000—00063
4900084—0000
360485200500360492600500360500000500360507200500360514400500490084 —09971
39060270010034 0010248 4900036 1604935-041421049350027643—09972
04950 160489R-505742150493N 01604887J200021048870027621048870027621—09973
048870027621048870027621048870027626048 9R048873200264 42360020100500 —09974
4505060002631400276000N1460564801300260579100280170490 0-02253200211 —09975
1400212 -0460520401200320021 6 260027600212170490 0-0230440506000264 —09976
360521600500360528800500360536000500360543200500360550400500490084 —09977
2600470052393200201 21052390020524052390041446050600110026002 2N00470 —09978
440532400216210022000470260023-002201200470J00001105791 -1360020100500 —09979
450538000263490508 4 2400280057914705852012004305524002621605603-02011605 —09980
615-0207270559205591110560 3 -11105615 -52705592055911105603 J11105 —09981
615 -7450544005 60L2100269004702100274004702505583002 7M310026R002011600 —09982
360557600500360564800500360572000500360579200500360586400500490084 —09983
27M 49-5336 4405642 4405630 220561N0047042210561N0047042 —09984
1605683-04141105683 -14505801 220523900414470008401100120523 9 -1 —09985
3905897001001505240
4905780 43058280568L4905660 390593100100490486 4 390598500100 —09987
34 0010248 4905348 56654559534157000
360593600500360600800500280523900470360020100500450185200263490508 4 —09989
5941596800626442595664634955450054496262495 5470
62455864455543450
008480000000000000000000000000000000000000000000000000
2O004850999RJ209999000-22O004830999RM3100800766P160060700O72
3200099000004909730000 00
J610810-9554M410140004831600607 00O73J610810—9754330048300000
J610567-6793K610579004853307 66P00000150848P0000J140766P000J5
M61024401300210048300483J110567000L1M91017600000
2600596070082200596004832600099008592607 71 R00596290804J00483
260048508 04J260007900840230048500485260055807 71 R210048500485
26005640778 8K6104350791426005960679226000990086016080 4J000J0
190804J0000021005960009726000790084023006960055826005960771 R
J210435000-21200564000-1M71040001200260007900840230059600485
210771 R0048526004850000320048500000220048507 71 R260009206790
2L069171057921000990048511000970 00-0M610812012001600558000—3
26004880009933004880000025004890059 7M3107680766P310766P0765L
15004880000032076 6P00000120055800 0--1M91070000000
1500489000002500486005972600485005584909554 00000
26004830679016004850 00R RM91080400000
011320000000000000000000000000000000000000000000000
2O004850999RJ209999000-22O004830999R1600596000—12600594069 79
M3100800766PM91097200000
2507245004833300483000002600079008372300483069472600560004 85
2500489004862600488087 0JM3102120766P310766P0765L1200560000—1
320766P0000024005600768 0M71097201100M61024801400110056 0000—0
M61042401200M71049201300140056000 0-2M61110801100M71035201300
21005960765L310848P0765LM91040000000
150848P0000-330766P0000021005960766P310766P0765LM61110801400
320766P000-0J6104230000-0140765L000L4M71056401300120765L000L4
J110423000-1M91043600000
J610551-0485K110551005602608 48P06790330766P000002600485 00000
320766P00000260007900859230048506916320833M00000260055808 25N
26004870825NJ610707000-221005940055826000790084123005580048 7
260009908 29J160829J000-0190771R00000M610752012002600558 00097
J110707000-1M91063600000
J410423000-0M6108440120026000790084123005920721332083 3N00000
26005920804JJ210423000—1M91076400000
M41097207245260009900858260825N06977290826P00592M610936 01400
2600590077 1R1200596000-1M91094800000
1200596000-2M61097201200320059600000260048300590260048500596
J5110330000925004860059716004890 0-0049095780000015000990 0000
M4110880724516006070 0O754910294 00000
16006070 0O74490973000000
J51103300001M91100800000
009020000004000000360000000000000000000000000000000000000
J51014300000KO1003509990M91004800000J5101430000J2O004851003N
```

10035000-22O004831003NM9108420000015O848P0000—J51014200001
41016800483330048300-00MM1016810143J51014200000260762P06792
00485000-0M61072401300240048507680M71026401300J610263—0484
110263004852107762P00000ML102881014321O762P07098220762P07038
61028801100320056700000210762P07068M71037201300J210142000—1
0762P00000210762P07098260007900839230762P0762P260762P0804J
00567000026004850697 7LJ1082310832J51052900002260009908O4J
0771R0-0002R0804J10830M61065601200260055800OR522004850O558
10824000-2J110826000-2KL1082610824K610830000992600079008 67
0762P00558J4105290R521M61045601200J51052900001M91046800000
00484067914609624012001600558000-14L10246101423200099 00000
1024600000
0048500402M61079201100K61077805956K210778004852600000 00483
91026400000
000990000016006070OO71491029400000
-2—002
M108781014324004850168747095780110033076 6P00000M91009600000
2560000000000000000000000000000000000000000000000000000
)004850999RJ209999000-22O004830999RM3100560766P490962400000
400910-000M41010400483121008900000330048300000140048500 0—0
61088801100M61028401200K31017500402120009800 0-53200097000M0
610190000971400435-0000M711112013 00J610271-0483K11027100485
0848P06790330766P0000026004830000 0320766P00000140765L000K9
7104280130026000970679013004830 00-6150804J0000J220048307154
005960000992600079008372808O4J00483290826P005962600483 0771R
21009100000260007900835230048300483260055808 25N260059606791
61053507914K61028307788260009900832160804J000J0190804J00000
000960059626005960009626000790083623005960055826005960825N
210535000-2J210283000-1M71050001200260055806977220055800596
000790083723005580048 3MM1072810091M61071601300320825N00000
0825N07183MM10764100903208 25N00000210825N070981600558000—1
004850826PM3108440848P310848P0766P15004850000012005580 00—1
91078800000
0848P000002600483004822N000991008949095420000 0
21009000000260009900856260825N06975290825N0048326004830825M
3109920848P320766P000001200485000—1M91101600000
004830048212004850 00-2M71106001300M61028401200320048500000
91014000000
00558000-0260048307126M91086800000
100099100894909554000 00
M11092100902607 62P00483260048307097240048507680M71123201100
00569000001500568000 0-K6113107627K11123100485220048300000
00558000-1M91085600000
53600000000000000000000000000000000000000000000000000 00
0999R000N0J209999000-22O004830999RM3100560766P490962400000
0848P0000-J51046900002M4101280048333004830000 0J51046900009
00607000 76M31047600098K61020607719M41017600099320009700000
00485000972800080067912600000004 83K61028608335K61029108487
610370083352600483 06976M91037600000
11029J000-22200000000 00M61026801300J410291-0483M61042001300
J1028O1029JL31028O00000J110370000-1320000000000J110286000—2
110291000-1J21029J000-9M91028000000
00080067911300483000N0260048300097320766P0000042097 5400000
100099000N0330766P00000K61020608041M61017601300M91016400000
082000000000000000000000000000000000000000000000000 00000
0004850999RJ209999000-22O004830999RM41006200484330048300000
0000000000
300485000042000000000
0005N40O60242RO439N52000000000000000000000000000000000 0000
00201006002500047 0027M310026R00201150027M00000470000001400490000000000000N103
26356570
15590045000
0-0-0-0-0-0-0-0-0-0-0-0-0-0-0-0-0-0-0-0-0-0-0-0-0-0-0
0-0-0-0-0-0-0-0-0-0-0-0-0-0-0-0-0-0-0-0 —
999999999-000000000-000000001
000000000000000000000000000000000000 00
000000000000000000000000000000000000 00
999999999999999999999999999945107070
070707070707070707070707070707070707070707070707070
0707070700
601369000985160129 70-187490108200000260136901021160129 70—287
901082000002601369010571601297 0-4801501039000012601735012 95
2012960000016011 17-000-150147500002160060700079160157 7J0969
2101577012972101577012971601268J096915012100000J311096800682
111055006811401295000-470127401200340000000102430133401089
71096900000470132201200460126200400150957900002110 1369—0005
26013640136R490136R000001601297 0-187490145400000260136901393
601297 0-387490145400000260136901429160129 70—580150108900000
9011060410657800000150147500009430153401115410152100000
501475000024301554010894901 58M0150121000000330152100000
90000001501739000094301618010894901738043017460 1210
401735000-1460172601100260126000769120126800 0-21401260000—0
6016540120014012 68J0969470173801300391096900000490119000000
401295000-2460172601300490173800000
5017390000249015980121049016300 1101369—000326010920136R
601485012682101268010922401268015774701904011002101369010 92
005950043019840108912010920 00-2470133401300110 1369—0002
60136R0148N1101485-000249019160120 1092000—2150121000000
7013340130011013 69-0002260148N0136R1101485—000249019840000 0
302132011152502131012101601584-210849014740150147500001
50121000000110 1369-000526013690136R490158601101369—0007
201114000-1460222401100460133401200491117601 36R1201369—0002
6013690136R490134601601584-5950491134200009420000000000
101369-000326010920136R21012680109224012680157746022560 1100
60148501268160257 2-04851601584-279043014740108926021310 7269
600485007891601584-2674120109200 0-2470147401300120148 5—0002
4038010148N49111440130024036850148N46026020120014014 8N000K0
1602622012001401 48N000J0460147401200490264202500000014 8N
402572021314702642013001202572-0001490242603200485—0549
9014740260048500789160060700 07P49014740320726R—0611
260958410942449767201521330152 1-0099260152J004851201521—0002
260152J0048344013220060733006 07-054949059500160322 9—0550
1603249-0486260048501 52J440289400484120152 1—000226004830152J
2607288109504907906015072830000231005290009581602997—0549
1203249-00011203229 000225032 2R0324R430297403 24R490298600000
2602997032293300548000004402918032 2R1402997—0549470305401200
16012600P0004901334044030900048512029 97—0002160299P000K0
1202997-00011603161-05482203161029972403161010924605738011 00
320316100000210316101268120316 1-0002310316J0299P1601260000—0
4901334033010890000049032500320108900000 1101369—0003
26034390136R1101369-00022601140 0136R2601485012682 60109203439

2101092034392101268010922401268015774602256011002602131012 68
1202131-000226044010343926032290766715000970000016000990 00—0
4304478010892600485074 3P1604216-37541601584—437824036850148N
4703570012001204401000-11101485-000224014850126847034900 1300
490423401401 48N000K0460373001200140148N000J0460374201200
4903766000026004850743P15006070000P490422204036300009 7
1601140000-01604216-37421500097000J1204401000-1490419800000
32000900000012044010 00-11101485-000214014 8N000-046043460120 0
140148N000P0460413801100460434601200140148N000—3460366201200
440363001089160388300-001504119000011401 48N000M5460407401200
140148N000K0460406201200140148N000J0460407401200490398200000
470363001300430400600097120440100-0124014850213146041 0601300
2503882014 8N1101485-000249039940150411900002110148 5—0002
1204401000-1490391002503883014 8N210440103883490422200000
33000900000140322 9-04844604198013002503 22R0148N1103229—0001
2401485021314703754013004401254076 6P1600485000RR49014740000 0
220440101140430363004399320440000000260048504401320766P00000
4401474000993200483000040401474044013800081204401000—1
490419804404 43401521330152100000260728810958400790600000
1507283000002260152004851201521-0002260152J00483490275800000
2401140000424704514011002601140000422601138011 40210113801140
3100489009181603229-05481603249-04841601584-4642120343000 0
440147401089120 2131-00081203439000-44901474026005841096 6
2600485015 2J440767200484120152 1-000262004830152J1500570000 2
2603741021312203741011384 06337-0548220433701138260431303741
1204313-00021203249-0001250322R0324R330322R000001203229—0002
24032490766746047860110016032 2R000-044048040048316032 2R000K0
160489100-00210489101140210489100485260440104891220440100402
2403439011404705770013004305014076 6P15095800000J160440100—9P
440528201089220343900402460513401300430508609580220440103439
430577004399160513 3-05482105133034392105133043926005480000 0
31005490090843057700439925005560440125005540440044052060440 1
1500551000022602132J0055031037 4J0433P49057060160431L000P0
2604821011381504399000 0-4905658031005490091643052 3809580
43057700439914048910 0-00470523801100240489104343946057700110 0
2604821044012104821044014405562044011605437—0548210543704821
2600548000004405530004852601260005502604 31L0632J260299703741
1102997-00024305706029 0P160299P000P04905486026043 1L0433P
310374J0433P4905706026055920213122055920482126000000 0550
2605700021312404401011404605670013002104337048213103 74J0433P
2605700126816057 05-09192105705054821260213J000001603 74J000—3
1601260000-04901334031006100070231006100299P490589000000
3100620007123100549009082500556004852500554004841600551 00M51
440555400485150055100002310061207 34N2600611006131600613000—3
1401735000-216006097 8004705950013002605947017353900599 00200
34-056700102390059900100340000000 1023100608007684901 32200000
1101369-000321012680136R490133401101369—000326010920136R
260148501268210126801092240126801577460225601100260213101268
1202131-000216015 84-639843014740108916015 84—6178490147400000
330148N000001101485000-12401485021314706178013004406342015 21
3301521000002601 52J007892201092004044606322011002101 52101092
260152J0213J490275800548150060700 00P49027580160152J000—0
1201521000-2260152J0761122010920040249062740260048501 52J
44066520048412015 21-00-22201092004024611276011002101 52101092
260213J0152J490133400000150111500001150147500009210649306249
260656207516440657806493160656200 0-02206562004042106493065 62
2601521064931206189000-14706638012001501115000004601534013 00
420000000000
2201092004044906446000002609585066754709586004003400000001 02
4406744004843807 66P001004909586038072 6R0010040095860000 0
-00000000000000000000000000000
-6931471805599453094172321214 58
J3862943611198906188344642429 16
K07944154167983592825169636437 5
K3025850929940456840179914546 84
M34294481903251827651128018917
J000000000000000000000000000000
K000000000000000000000000000000O283185307179586476925286766 56
L14159265358979323846264338328J5707963267948966192313216916 4
P853981633974483096156608458O000000000000000000000000000000
N404195002705841554435783646 1K1877616239495525622261149163 8
34000000001023900599001004207246044072700724532004 85—0486
15072390000242000000210048507 28R460731401400420000000000
4407366004853300485-054726072890732149072900320048 5—0621
49073460000022004850739R4907302000002300485007 41L320940J—0801
260048500099420000002800099004852909 40J0745P460750801400
260048502 72J420000000000
1600607-2N782600485007794907214000002800099075 4L290940J00485
490748200000
440763000484440761600483330048 3—0799420000000000
3200483-0568420000000000
4407656004853300485—0485420000000000
3200485-048442000000000 0
1100485-00-046096240120025000990048533004 85—0097310058707 26R
2600483067902600500400416077 79-05874307812000001200558—J0—1
1107779-0001490776803107 66P0777R2607858907667110785 9—0001
4507836000001507 85R00000250048600597260059600805491023400000
1400485—J0—04607950011002600485007894907282025072450048 3
24004850040447080300110015072390000916006070 0N7926004850077 9
49072140330048 3-0098260059600826005606807892606096076 27
2208096004852100000004832600485005684907246000026005 5680812N
1100568000-04708176012002600485007994200000000000
1100485000-04708232012004408174005681600607 00P7149075200000 0
15083490000133072 45-0099320056 7-0100130055800 0-5330056 7—0096
43083120009949083360440834800485320724 5—0097330048500000
410873400000
24004850079946072460120044084280056816006070 0P72260048500789
4907214026005960048512005 68000-146072460120023004850059 6
320940J-04832600485000991102 72J000-046084400120016006070 0P73
1507239000094907520000026005680655R1100568000—047086220120 0
1600485000-126004830697542000000000 0
43086607 66P440862000568160060700P744909334026005 5800485
25004850048333004 83-01021500484000001508349000094908244000 00
1500485000001610228-04851609755000M91509579000091609584—957P
44089420056 8300-568-054926000079008442808 04J06977290804J00485
26004850771R1609577-8910261071700558160055800 0—1491070600000
4408942004844409090004854909110026005480048526005560055 8
1609577-90701610517-055612005680 00-146091420120026000790084 4
2300485005 6320048507 71R210055800556491049404408990004840484
49089220160060700P75490912201600607 00P761609232—975 4
4909154016092 32-9542250009907245160975500 0L41609577—9542

1610228-04841509579000021610517-04854900000000000026005280923P
1209237000-226005260923P1100526000-046085960120043093540766P
440957800526160060700P77150009900000490973001509499000009
4409402004831509499000013300483-01001509579000091609584—9434
49-003601609584-94661610397-0528491039801609584—9486
49-0036015095790000241095780000160060700O76150009900000
4909754026004850055844095780009932004830954242000000000
260958N004851209585000-2260958N00483420000000000
2600483067901600485000 R R49095780320765L00000310766P0765L
260048500558420000000000
110558000-1470957P01400160060700N711600485000 R9260048300907
340957P00102390059900100490955400000150987500002260982500789
49098380000015098750000126005960982N1209825000—2260059406791
21005940982M260055300485260048400483330765L00000150766P0000—
240059600558471003001100260055600484260048400594260059400556
2609834005582600558005962600596098341610137—0594220059600558
460965601400211013700596210059600402470965601100441012600594
321013P0000021004840000046096360120015102930000215097290000L
2500099004843300484000043096940766P310766P0765L150048400000
320766P00000430957P0766P1200558000-1471021001400160060700N72
1600485000 R R260048306790490975400000441037400483330048300000
2609825103294909826032004830000049103540000026005581039P
1210397000-228000790086923004831039P460962401200210055800485
260048408261P151029300004471024601400441052600485491028200000
1509729000034609718011001600558000 R949101980000026107171067L
2600558004851210673000-2260007900870280825N00483290825M1067L
1509729000746097180140026004840825N250009900484460963601200
1200558000-0150972900006471019801400440971800485151029300006
4710282013001600558000 R R49102460000026005581080J261071700485
1210801000-2260007900870280825N1080g290825N00483250048500558
49106460000026004851089P1210897000-226004831089F42000000000
4 R0272204 R0283204 R0442204 R047020P0
4702566011004602602012004902486
21011140136P470133401100490222401101369000-71201117000 -1
46022240110046013340120021011170136 R4911188
1201092000-24906446016006070007926012680157742
320111600000491120801600607000792601268015774901474
360010000500360017200500360024400500
00000000000102030400020406080003060902100408021610060015102006021814200
7041128200806142230090817263000000000005060708090012141618151811242720242
822363520353045403632484455324946536048465462754453627180123456789123456
310031600036150032400006490008400000789—2345
22000180040432-07800000022000420040432-079000000490008400000
220726900404220272100404220940100404210762700402490008400000
22000180040432-080000000220765300402220766700402490008400000
220771900402220804100402220825500402220826700402490008400000
22000180040232-09080000022000420040232-679100000490008400000
260619900402210619900402260636300404210636300404490008400000
210743700402210761300402220263300404210778800402490008400000
220278106363210268506363220881700402220632106199490008400000
220734506199210737706199210751600402220848700402490008400000
2100023004022606824-67962100047004022606855—6827490003400000
2100023004022606886-68582100047004022606917—6889490008400000
2100023004022606947-69192100047004022606975—6947490008400000
2100023004022607008-69802100047004022607038—7010490008400000
2100023004022607068-70402100047004022607098—7070490008400000
2100023004022607126-70982100047004022607154—7126490008400000
2100023004022607183-7155220768000402220833506199490008400000
210791406199210595600402220829100402220870100402490008400000
440008412001210943212005440008412006210948412010490008400000
2100023004022607213-7185250048600060250059700060490008400000
160008300-00210008300402210008300402210008300402490008400000
210008300402210008300402260168700082320168700000490008400000
900047001003400000001024800000000000490040 R00045556345590044163410

Obviously the programming of all of the material into the computing machine as complete data serves the dual purpose of having all of the data operate, one part as a limit upon the next, whereby the line computations result after consideration of all of the data, and secondly, since all of the line computations are retained in the memory of the machine, it is possible to suppress selected portions of the available data and thus produce a desired view in separate planes. Moreover, any plane may arbitrarily be selected to visibly reproduce the data available in the memory of the computer as lines visible in that plane.

Figure 9:
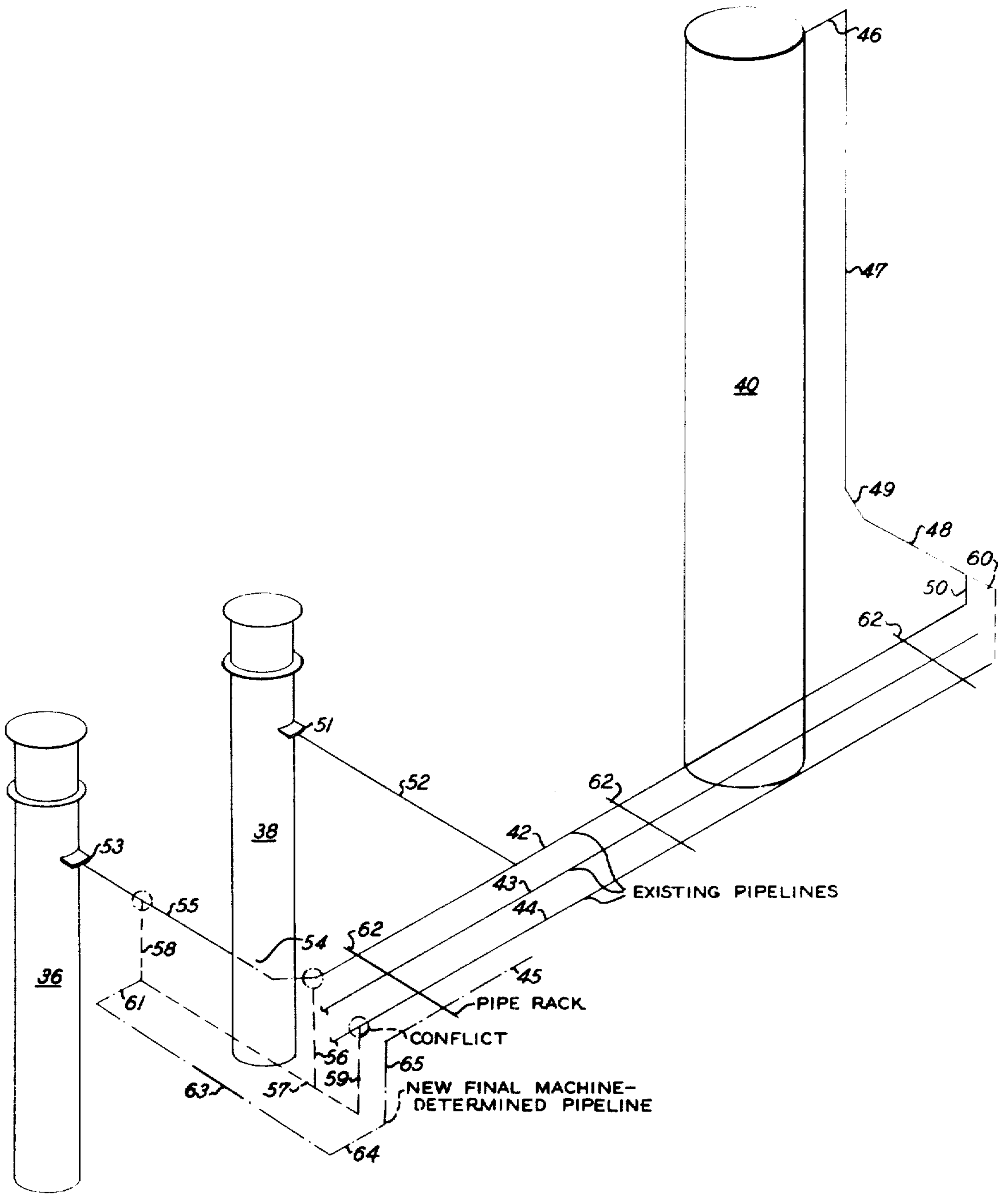
FIG. 9 is an isometric view illustrating several interconnected units, and the manner in which the computer exercises its normal freehand choice to design the piping paths.

The principle by which the computer actually operates to "-draw" the several lines in its memory, and first shown in very elementary form in FIGS. 8 and 10 is further illustrated more specifically, practically or sophisticatedly, in FIG. 9. That figure shows three towers 36, 38 and 40 to be interconnected by some of several pipes 42, 43 and 44, longer portions of which are to lie parallel, symmetrically stacked for easy interconnection and servicing upon a pipe rack which comprises several supports or brackets 62. The tower 40 is interconnected with one end of the pipe 42, the exact location of its nozzle being hidden from view, but which is available following several bends for interconnection to the far end thereof, 46. A center interconnecting portion of that pipe 47 illustrates that a portion of the pipe may follow one of the programmed limits to lie parallel, but not to pass closer to the tower 40 than certain fixed limits, to avoid heat exchange therewith, except in the portion 46 approaching the nozzle. The intermediate portion 48 is connected by suitable bends 49 and 50 to the long body of the pipe 42, whereby each of these pipe sections is parallel to one of the X-, Y- and Z-axes for the bulk of their running lengths.

The system as shown in FIG. 9 may permit or require interconnection of another end of the pipe 42 with the tower 38 through a nozzle 51, the connecting pipe being a line 52 having the same vertical dimension as the pipe 42. Other data in the system, however, may require connection of an end of pipe 42 with the tower 36 by way of nozzle location 53, which might have caused that pipe 42 to run directly into the tower 38, or to pass through it according to dotted line portion 54 in order to continue in its fixed direction through line 55, to connect with nozzle 53. However, since one of the program limits is that no pipeline may intersect another, except when directed to do so as in the case of pipe 52, or be located so as to run into some obstruction, the computer proceeds to compute its way around the obstruction, following any of several alternate paths of the type shown in FIG. 8. For instance, the computer may attempt to pass the pipe under the unit 38 in the lower Y-direction, passing first from the end of pipe 42 by way of dotted line 56, and then through pipe 57 under the tower 38, and then bending to vertical by line 58 to connect with line 55, and thus completing its connection with nozzle 53.

It would have been possible, of course, to follow other alternate paths as shown. For instance, the pipe 57 might connect through an alternate vertical leg 59 into a pipe 44, disposed a further distance away from 42 but parallel thereto the pipe 44 finally interconnecting with pipe 48 by way of dotted line pipe 60. As a still further alternate, pipe 58, after descending a certain distance (or even pipe 55 without descent) could diverge laterally through a leg 61, continuing thence by a laterally displaced line 63 into lateral return line 64 and leg 65 into a new line 45, the line 63 being thus diverted sufficiently laterally to avoid the tower 38. Thus the computer is flexible, computing several alternate connections with existing lines, or computing a new line 45 as may be necessary to complete the piping within the limits or rules imposed, as may be necessary to avoid any obstructions.

One obvious limiting line condition that will usually be read into the machine for most of the lines is that each line that is drawn will form a limit upon the subsequently determined lines that are to be computed, so that the next computed lines will not intersect or interfere with the preceding lines. It is also possible to provide limits for the next lines following the computation of the first, that they will not come closer than a certain limiting distance, whereby there will be no temperature interchange, no heat transfer. A further limit may be that each line will tend to lie parallel, insofar as possible, to other lines for optimum symmetry of design. Having then completed the connections by the computer as a series of computed points formed in the memory of the computer interconnecting the nozzles, the results can be typed or printed as legible data points which are a visible and storable form that can be read and subsequently used at any time and place. They can be punched upon cards or tape or impressed upon a magnetic tape from which they may be stored as a subsequently useful form, as cards of tape. That information supplied and programmed, or computations thereon, may be stored in the memory of the machine without immediate use, or they may be formed into cards or tapes, etc., and used directly for operation of a drafting machine such as an X–Y plotter, operated by this data output of the computer in any of these forms. The total data output of the computer for visibly illustrating linear data as drawings is illustrated in FIGS. 2, 3, 4 and 9. They are the line drawings which result from operations of an X–Y plotter from data placed into the machine.

The original locations of the units as shown in FIG. 5 may be drawn upon standard graphically sized and crosslined paper and drawn to scale in terms of the units that will be used by the computer, or some scale multiple thereof, usually in the several views, and of the exact size as would be reproduced by an X–Y plotter. Consequently, the X–Y plotter may have the same data sheet with unpiped units mounted therein and the piping completed by the operation of the stylus thereof directed by the data supply from the computer. However, this is not necessary, since the computer itself having the data herein significant of outlines of the units, comprising squares, circles, triangles and evenly varied curves, mathematically available therein, can also operate the X–Y plotter to reproduce the units themselves as finished drawings, exactly as shown in FIGS. 2, 3 and 4. Thus, since the computer-plotter system has the data defining the minima and maxima in the several orienting directions which constitute or which, following available computations may constitute the boundaries of each unit, the units themselves are readily reproduced by the X–Y plotter, together with the interconnecting piping, in any of the views desired, from data supplied by the computer.

Figure 1:
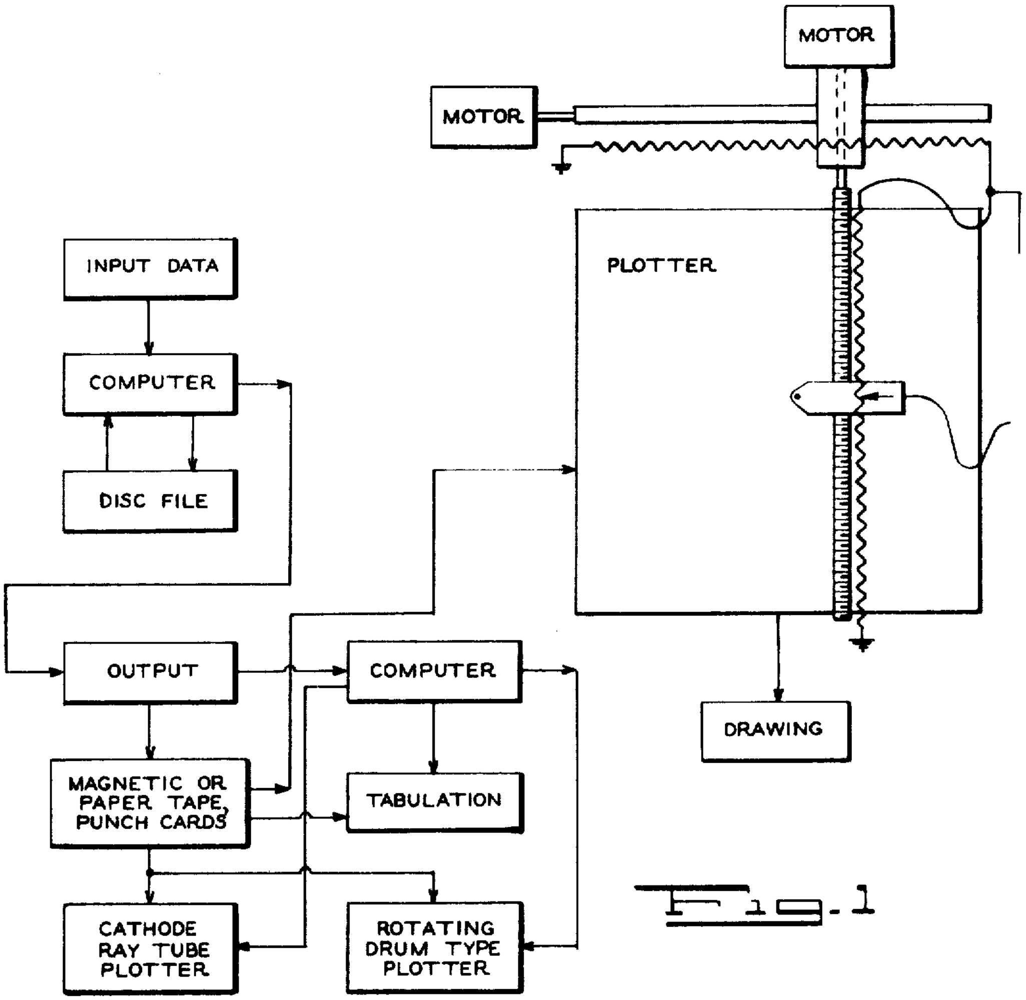
FIG. 1 is a diagram of the process steps and combinations of means for obtaining and supplying of input data and programming to a computer, and the ultimate conversion thereof to visible form.

As shown in the diagram of the total system, FIG. 1, input data, comprising orientation, spacing and dimensioning for the several units of the system are placed into a computing machine from an elementary plot plan. This is followed or preceded by programming of desired limits into the machine to interconnect such data according to the imposed limits or rules. The computer thus can operate to compute the data into linear form which may remain in the machine, or it may be placed in an intermediate punched card or tape storage form, or sent direct to a mechanical device which converts the data to visible form as visible lines, such as an X–Y plotter shown diagrammatically at 32. That X–Y plotter is of known construction, being described in detail in U.S. Pat. No. 2,541,277, dated Feb. 13, 1951. There are other known devices which can be used to convert such data to visible line form, such as a Universal Drafting Machine known as an "Orthomat." Since the computer will have been operated to select data lines lying in a selected plane, X–Y, X–Z, Y–Z planes or combinations thereof, the X–Y plotter will have produced a drawing 34 corresponding to FIGS. 2, 3, 4 or 5. Thus, the computer has been caused to make a full drawing in a given plane as illustrated by these figures.

In forming drawings other than the simplest type where large amounts of data are necessary, the data such as compiled in a long chart, as illustrated in FIG. 7, ready for use by the computer, or after having been further transformed in the memory of the computer to data significant of the lines to be reproduced visibly, may have such data stored at any preliminary intermediate of final stage upon disc files. Such disc file may typically be an IBM 1311 Disc Storage Drive which contains numerous data storage discs mounted between protective plates upon which the data from the computer may be transferred, and returned as needed to the computer to effect a final overall drawing. Thus some of the input data to the machine may be from the disc file and some may be original input data available from a plot plan converted to the form of FIG. 7. Again, as shown in FIG. 1, the output of the computer may be returned upon magnetic or paper tape of punch cards. It may then be exhibited visually on a cathode-ray tube plotter, or as a drawing by an X–Y-type or even a rotating drum-type plotter, typical plotter types known in the art operable from tape or punched cards.

The computer can, of course, be selected to have adequate capacity for the computations involved for the particular size of job. The drawings of FIGS. 2, 3 and 4 were made with the aid of an IBM, model 1620 computer, but numerous other computers, adequate for this and larger computations, are commercially available. Such computers have adequate sophistication to perform numerous other computations which are useful adjuncts to the development of linear data as described. For instance, the computer-plotter system can measure the length of piping, or lengths of different sizes of piping, and count the number of elbows, valves, etc. It is, therefore, within the scope of the present invention to combine the various useful jobs performable by the computer-plotter system with the compilation of the linear data described.

Various modifications will occur to those skilled in the art whereby linear, interconnecting, or design data is computed from oriented points within certain imposed limits, the linear data can be made visible in drawing form or stored as data. Accordingly, it is intended that the several drawings and the specification be regarded as illustrative and not limiting except as defined in the claims appended hereto.

What is claimed is:

1. Means for mechanically designing and visibly illustrating a piping system interconnecting several separate operating units into a composite fluid processing system, comprising the combination of a computer, computer data transferring means for feeding the computer with coded data and a printout means converting data stored and computed by said computer to visible form, said computer being programmed with coded data developed from a plot plan, said plot plan comprising a three-dimensional graphical arrangement with respect to a graphical origin of several units of the system to be linearly interconnected by piping in three-dimensional space, each of the units being marked on said plot plan with center point, maximum and minimum outline distances of each unit in scale size measured from the graphic point of origin, and further having marked thereon the points at which said units are to be interconnected, said coded data developed from said plot plan comprising said linearly measured distances first formed into a table of X-, Y- and Z-coordinates of said center point and outline dimensions of each unit and the X-, Y- and Z-coordinates of the points thereon to be linearly interconnected measured from the graphical origin of said plot plan, said measurement data being converted to coded form acceptable to the computer and then fed to said computer through said data transferring means, said computer further having other programmed steps executed in its memory to impose constraining limits upon said coded data, whereby upon execution of the total programming in the memory of the computer pathways are defined interconnecting said points within said constraining limits, each line thus defined becoming a limiting exclusion upon the next succeeding line to ultimately convert the data in the memory of said computer to visible form comprising a piping system including said units linearly interconnected through said points.

2. The method of designing, interconnecting and visibly illustrating a system of linearly interconnected operating units into a composite operating system, comprising forming a plot plan consisting of a graphical diagrammatic arrangement of each of said operating units with each unit of said system graphically positioned therein in scale dimensions and arranged in three-dimensional space as each unit is to be interconnected into the system, the center point, maximum and minimum outline distances of each unit to be interconnected measured with respect to the graphic point of origin and with respect to their X-, Y- and Z-coordinates, forming a table of said center point and outline dimensions of each unit and the points thereon to be linearly interconnected in terms of their X-, Y- and Z-coordinates measured from the graphical origin of said plot plan, converting the measurement data of said table to coded form acceptable to a computer, feeding the computer with said coded data, executing programmed steps to impose constraining limits upon said computer to compute and store data representative of said points in the memory of said computer, executing programmed steps to mathematically define a path interconnecting said units to be interconnected within said constraining limits, whereby each line thus defined becomes a limiting exclusion upon the next succeeding lines, and finally converting all of the data in the memory of said computer to visible form comprising a system of said units linearly interconnected through said points.

3. The method as defined in claim 2 wherein the system is a piping system, piping segments serving as said lines to interconnect said units, and the data formed in the memory of said computer is finally converted to visible drawing form defining a piping system interconnecting the units for fluid flow from unit to unit of the system.

4. Apparatus for mechanically designing and visibly illustrating a system of linearly interconnected points to form a composite design, comprising the combination of a computer, computer data transferring means for feeding coded data to said computer, and a printout means converting the data stored and computed by said computer to visible form, said computer being programmed with coded data developed from a plot plan, said plot plan comprising a graphical arrangement with respect to a graphical origin of several points to be linearly interconnected in space to form the composite design, each point being marked in said plot plan measured in scale dimensions from the graphical point of origin, said linearly measured distances being formed into a table of coordinates of said points, said measurement data being first converted to coded form acceptable to the computer, and then fed to said computer through said data transferring means, said computer further having other programmed steps executed in its memory to impose constraining limits upon said coded data, whereby upon execution of the total programming in the memory of the computer pathways are defined interconnecting said points within said constraining limits, each line thus defined becoming a limiting exclusion upon the next succeeding line to ultimately convert the data in the memory of said computer to visible form comprising a composite design of said linearly interconnected points.

5. Apparatus as defined in claim 4 wherein the system is illustrated three dimensionally and said plot plan comprises a three-dimensional graphical arrangement with respect to a graphical origin of several guide points to be linearly interconnected into said system.

6. Apparatus as defined in claim 5 wherein the said printout means visibly illustrating the system is an X–Y plotter converting said linearly interconnecting data of the said system in said computer to drawing form.

7. The method for designing and visibly illustrating a composite operating system of linearly interconnected points comprising forming a plot plan consisting of a graphical arrangement oriented thereon with respect to a graphical origin of several guide points to be linearly interconnected into said system, converting the measurement data of said points from said graphical origin point into coded form acceptable to a computer, feeding the computer said coded data, imposing constraining limits upon said computer in the form of programmed steps to interconnect said points into a composite system in the memory of said computer, executing said programmed steps within said constraining limits to mathematically interconnect said points into a composite system, and finally converting all of the data in the memory of said computer comprising said composite operating system into visible form.

8. The method as defined in claim 7 wherein the system to be illustrated is three dimensional, the points to be linearly interconnected are measured and coded into the memory of the computer as its X-, Y- and Z-coordinates measured from the point of origin of said graph, and the three-dimensional system is illustrated as linearly interconnected points.

* * * * *